(12) United States Patent
Koc et al.

(10) Patent No.: US 9,073,758 B2
(45) Date of Patent: Jul. 7, 2015

(54) SYNTHESIS OF METAL BORIDES

(75) Inventors: Rasit Koc, Carbondale, IL (US); Jennifer R. Mawdsley, Woodridge, IL (US); John David Carter, Bolingbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 396 days.

(21) Appl. No.: 13/454,022

(22) Filed: Apr. 23, 2012

(65) Prior Publication Data

US 2012/0315207 A1    Dec. 13, 2012

Related U.S. Application Data

(60) Provisional application No. 61/477,976, filed on Apr. 21, 2011.

(51) Int. Cl.
*C01B 35/04* (2006.01)
*C01B 35/00* (2006.01)
*C01B 35/02* (2006.01)

(52) U.S. Cl.
CPC .............. *C01B 35/04* (2013.01); *C01B 35/02* (2013.01); *C01B 35/00* (2013.01); *C01P 2004/62* (2013.01); *C01P 2006/12* (2013.01)

(58) Field of Classification Search
None
See application file for complete search history.

(56) References Cited

U.S. PATENT DOCUMENTS

| 4,353,885 | A | * | 10/1982 | Hoekje | 423/289 |
| 5,087,592 | A | * | 2/1992 | Nadkarni | 501/96.3 |
| 2012/0177556 | A1 | * | 7/2012 | Graeve et al. | 423/252 |

OTHER PUBLICATIONS

Hermann et al., Bipolar Plates for PEM Fuel Cells: A Review, International Journal of Hydrogen Energy, 2005, pp. 12970-1302, vol. 30.
Hodgson et al., New lightweight bipolar plate system for polymer electrolyte membrane fuel cells, Journal of Power Sources, 2001, pp. 233-235, vol. 96.
Koc et al., Carbothermal synthesis of titanium carbide using ultrafine titania powders, Journal of Materials Science, 1997, pp. 3101-3111, vol. 32.
Lin et al., Reaction mechanism and size control of $CaB_6$ micron powder synthesized by the boroncarbide method, Ceramics International, 2009, pp. 3533-3536, vol. 35.
Matsushita et al., Oxidation of Calcium Boride at High Temperature, Journal of Materials Synthesis and Processing, 1998, pp. 407-410, vol. 6.
Shi et al., Low Temperature Synthesis and Characterization of Cubic $CaB_6$ Ultrafine Powders, Chemistry Letters, 2003, pp. 958-959, vol. 32, No. 10.
Xu et al., Single-Crystal Calcium Hexaboride Nanowires: Synthesis and Characterization, Nano Letters, 2004, pp. 2051-2055, vol. 4, No. 10.
Xu et al., Self-catalyst growth of single-crystalline $CaB_6$ nanostructures, Journal of Solid State Chemistry, 2007, pp. 2577-2580, vol. 180.
Zhang et al., The Size and Morphology of Fine $CaB_6$ Powder Synthesized by Nanometer $CaCO_3$ as Reactant, Key Engineering Materials, 2006, pp. 369-372, vol. 326-328.

(Continued)

*Primary Examiner* — Guinever Gregorio
(74) *Attorney, Agent, or Firm* — Dentons US LLP

(57) ABSTRACT

Methods for the synthesis of metal borides. Metal boride compounds synthesized by those methods are also disclosed.

31 Claims, 19 Drawing Sheets

(56) References Cited

OTHER PUBLICATIONS

Zheng et al., Synthesis of Calcium Hexaboride Powder via the Reaction of Calcium Carbonate with Boron Carbide and Carbon, Journal of American Ceramic Society, 2001, pp. 2725-2727, vol. 84, No. 11.

Zheng et al., High Temperature Oxidation of calcium hexaboride powders, Materials Letters, 2004, pp. 2586-2589, vol. 58.

* cited by examiner

SYNTHESIS OF METAL BORIDES

CROSS-REFERENCE TO RELATED APPLICATIONS

This application claims priority from U.S. Provisional Application Ser. No. 61/477,976, filed on Apr. 21, 2011, which is incorporated herein by reference in its entirety.

STATEMENT REGARDING FEDERALLY SPONSORED RESEARCH OR DEVELOPMENT

This invention was made with government support under ANL/DOE-DE-AC02-06CH11357 awarded by Argonne National Laboratories and the DOE. The government has certain rights in the invention.

BACKGROUND OF THE INVENTION

Metal borides are currently of interest for use in bipolar plates of fuel cells. Metal borides may also find use in electronic, aerospace, and other energy areas.

For example, calcium hexaboride, a cubic metal boride belonging to the group 2A is a material attracting much attention due to its high hardness, high melting point, low density, chemical stability, and high electrical conductivity [References 1-3]. Calcium hexaboride can be exposed to high temperatures, while being able to provide surface protection in corrosive environments. The light weight, high density and highly conductive properties of calcium hexaboride make it a potential candidate for use in PEM Fuel Cells as a filler material for bipolar plates. Since bipolar plates account for 80% of the weight of a fuel cell stack, and 45% of stack cost [References 9, 10]; high quality $CaB_6$ produced at low cost can potentially fulfill these responsibilities.

Various studies have investigated the synthesis of $CaB_6$ powders using various methods as reported in [4-6], where researchers have employed the carbothermal method using boron carbide ($B_4C$) as boron source to produce $CaB_6$. However, the carbothermal method so far produced micron sized particles. The carbothermal reaction is limited by the contact area of reactants. Because of that the final product contains unacceptable quantities of unreacted metal oxides. Reaction time is very long. Reaction temperature is high. The carbothermal method produces large particles with wide size range. The product from this method requires subsequent chemical treatment and milling. Other methods may also used to produce $CaB_6$ powders such as boron and calcium containing chlorine may be used to produce $CaB_6$; however corrosive by products and stoichiometry are problem. [References 7-8].

The $CaB_6$ precursors described herein are formed via pyrolysis of propylene. The low-cost method described herein, developed by Koc and Glatzmier, as briefly mentioned in [Reference 11], provides a pure form of carbon, which is amorphous, and provides excellent overall contact with the reacting powder.

There are no currently known methods of producing submicron-sized metal boride powders that are sufficiently pure enough for use. Such useful "pure" powders are compositionally pure (e.g., chemically pure and single phase), and are also within a narrow size distribution, spherical in shape, and free of agglomeration. Additionally, the known methods, which produce inappropriate powders, are not necessarily low-cost methods.

SUMMARY OF THE INVENTION

Provided herein are one or more inventions relating to methods of forming or producing metal borides and compositions thereof. The present disclosure generally relates to methods for synthesizing metal borides. This disclosure relates to methods for preparing carbon-coated precursors useful for synthesizing metal borides. This disclosure also generally relates to methods for determining the purity, size and quantity of carbon-coated precursors and metal borides.

In some embodiments, a method includes providing a first compound comprising a metal; providing a second compound comprising boron; providing a carbon source; and reacting the first compound, the second compound, and the carbon source at a predetermined temperature for a predetermined time sufficient to form a metal boride. In some embodiments, the first compound is a carbon coated first compound. In some embodiments, the second compound is a carbon coated second compound. In some embodiments, the first compound is a carbon coated first compound and the second compound is a carbon coated second compound.

In some embodiments, a method includes providing the carbon coated first compound comprises decomposing a hydrocarbon gas in the presence of a compound comprising the metal. In some embodiments, the method includes providing the carbon coated second compound comprises decomposing a hydrocarbon gas in the presence of a compound comprising boron. In some embodiments, the method includes providing the carbon coated first compound comprises decomposing a hydrocarbon gas in the presence of a compound comprising the metal; and providing the carbon coated second compound comprises decomposing a hydrocarbon gas in the presence of a compound comprising boron.

In some embodiments, a method includes carbon-coating a precursor(s) and reacting a carbon coated precursor(s) to form a metal boride. In some embodiments, carbon-coating precursors includes providing a first compound comprising a metal and decomposing a hydrocarbon gas in the presence of the first compound to form a carbon coated first compound. In some embodiments, carbon-coating precursors includes providing a second compound comprising boron and decomposing a hydrocarbon gas in the presence of the second compound to form a carbon-coated second compound. In some embodiments, carbon-coating precursors includes providing a first compound comprising a metal and a second compound comprising born and decomposing a hydrocarbon gas in the presence of the first compound and the second compound to form a carbon-coated first compound and a carbon coated second compound. In some embodiments, reacting carbon coated precursors includes reacting a carbon-coated first compound and a carbon-coated second compound at a predetermined temperature for a predetermined time sufficient to form a metal boride. In some embodiments, reacting carbon coated precursors includes reacting a carbon-coated first compound and a carbon-coated second compound at a predetermined temperature for a predetermined time sufficient to form a metal boride.

In some embodiments, the first compound comprising a metal is selected from the group consisting of Ca, CaO, or $CaCO_3$, $Al(OH)_3$, $Al_3(BO_3)_4$, $Al_2O_3$, Aluminum borohydrite, an Aluminum salt, $ZrO_2$, and $Al_2O_3$.

In some embodiments, the second compound comprising boron is selected from the group consisting of B, $B_4C$, $B_2O_3$, and $H_3BO_3$.

In some embodiments, the metal of the first compound comprises calcium. In some embodiments, the metal boride comprises calcium hexaboride. In some embodiments, the metal of the first compound comprises calcium and the metal boride comprises calcium hexaboride.

In some embodiments, the hydrocarbon gas is selected from the group consisting of methane, ethane, propane, butane, propylene, 1,3 butadiene, acetylene, allene, butene, neopentane, ethylene, methylacetylene, and natural gas.

In some embodiments, carbon coating the first compound or the second compound occurs at a pressure of about 15 psi, about 20 psi, about 25 psi, about 26 psi, about 27 psi, about 28 psi, about 29 psi, about 30 psi, about 31 psi, about 32 psi, about 33 psi, about 34 psi, about 35 psi, about 36 psi, about 37 psi, about 38 psi, about 39 psi, about 40 psi, about 45 psi, or about 50 psi.

In some embodiments, carbon coating the first compound or the second compound occurs at a temperature of about 100 degrees C., about 200 degrees C., about 300 degrees C., about 400 degrees C., about 450 degrees C., about 460 degrees C., about 470 degrees C., about 480 degrees C., about 490 degrees C., about 500 degrees C., about 510 degrees C., about 520 degrees C., about 530 degrees C., about 540 degrees C., about 550 degrees C., about 560 degrees C., about 570 degrees C., about 580 degrees C., about 590 degrees C., about 600 degrees C., about 610 degrees C., about 620 degrees C., about 630 degrees C., about 640 degrees C., about 650 degrees C., about 700 degrees C., about 800 degrees C., about 900 degrees C., or about 1000 degrees C.

In some embodiments, carbon coating the first compound or the second compound occurs in an inert atmosphere.

In some embodiments, carbon-coating the first compound or the second compound comprises about 10, about 12, about 20, about 24 or about 30 cycles of a carbon coating reaction. In some embodiments, one cycle of carbon-coating the first compound or the second compound occurs for about 10 minutes, about 11 minutes, about 12 minutes, about 13 minutes, about 14 minutes, about 15 minutes, about 16 minutes, about 17 minutes, about 18 minutes, about 19 minutes, about 20 minutes, about 21 minutes, about 22 minutes, about 23 minutes, about 24 minutes, about 25 minutes, about 26 minutes, about 27 minutes, about 28 minutes, about 29 minutes, or about 30 minutes.

In some embodiments, reacting the first compound and the second compound occurs at a temperature of at least about 1000 degrees C., about 1100 degrees C., about 1200 degrees C., about 1300 degrees C., about 1400 degrees C., about 1500 degrees C., about 1600 degrees C., about 1700 degrees C., about 1800 degrees C., about 1900 degrees C., or about 2000 degrees C. In some embodiments, reacting the first compound and the second compound occurs at a temperature increase or decrease rate of about 1, about 2, about 3, about 4, about 5, about 6, about 7, about 8, about 9, or about 10 degrees C. per minute.

In some embodiments, the reacting the first compound and the second compound occurs in an inert atmosphere.

In some embodiments, reacting the first compound and the second compound occurs for about 1 hour, about 2 hours, about 3 hours, about 4 hours, about 5 hours, or about 6 hours.

In some embodiments, the carbon coating reaction or the reaction of the first compound and the second compound is seeded with about 1% Fe or about 1% Ni.

In some embodiments, the metal boride formed according to a method described above has an average particle size diameter of about 100 nm, about 200 nm, about 300 nm, about 400 nm, about 500 nm, about 600 nm, about 700 nm, about 800 nm, about 900 nm, or about 1000 nm. In some embodiments, the metal boride formed according to a method described above has an average specific surface area of about 0.1, about 0.5, about 1, about 1.5, about 2, about 2.5, about 3, about 3.5, about 4, about 4.5, about 5, about 5.5, about 6, about 6.5, about 7, about 7.5, about 8, about 8.5, about 9.5, or about 10 $m^2 g^{-1}$.

Some embodiments provide a metal boride formed according to any of the methods described herein.

These and other aspects and features are discussed below in greater detail.

DESCRIPTION OF THE DRAWINGS

Those of skill in the art will understand that the drawings, described below, are for illustrative purposes only. The drawings are not intended to limit the scope of the present teachings in any way.

FIG. 2 shows two transmission electron micrographs (TEM) of samples prepared by the methods described herein.

FIG. 4 shows two TEM of samples prepared by the methods described herein.

FIG. 5 shows two TEM of samples prepared by the methods described herein.

FIG. 6 shows two TEM of samples prepared by the methods described herein.

DETAILED DESCRIPTION OF THE PRESENTLY PREFERRED EMBODIMENTS

Figure 1:
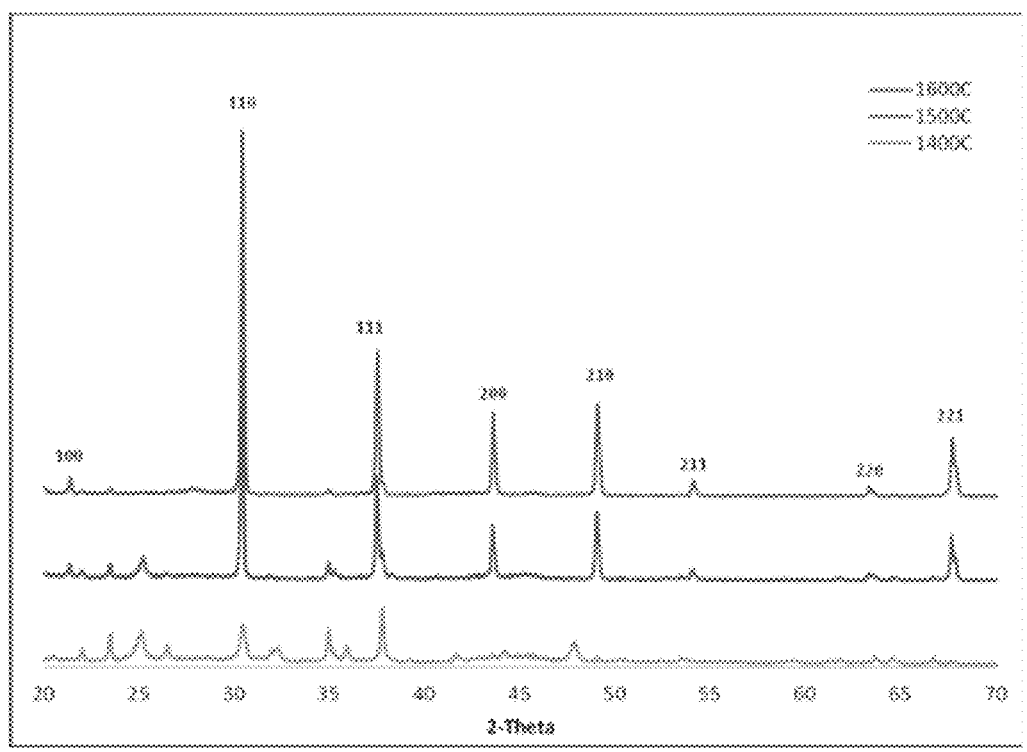
FIG. 1 is a line drawing showing an X-ray diffraction (XRD) spectrum of $CaB_6$ prepared from ($CaCO_3+B_4C+C$-black) coated for 20 cycles.

The present disclosure describes the synthesis of metal borides using carbon coated precursors.

One aspect of the invention(s) provides a method for the synthesis or production of metal borides. In various embodiments, a method for the synthesis or production of metal borides disclosed herein utilizes a two-step method. In a first step for the synthesis of a metal boride, a compound comprising a metal or a compound comprising boron can be coated with carbon by decomposing a hydrocarbon gas. The present methods are envisioned to be useful with a variety of boron sources or with a variety of metals, as further described below. In a second step for the synthesis of a metal boride, the metal boride can be formed by promoting the formation reaction at a sufficiently elevated temperature in an inert atmosphere. A carbon source, such as carbon black or a carbon coating of metal-containing compound or the boron containing compound, can be included in the first, second, or first and second steps of the synthesis process.

Metal

As described herein, a compound comprising a metal can be coated with carbon by decomposing a hydrocarbon gas. Such coated metal containing compound can be reacted to form a metal boride.

In some embodiments, the metal can be any chemical element that is a good conductor of both electricity and heat and forms cations and ionic bonds with non-metals. In some embodiments, the metal can be an alkali metal, an alkaline earth metal, a transition metal, or any other element commonly characterized as a metal in the periodic table of the elements or by IUPAC. The metal can be a base metal, a ferrous metal, a noble metal, or a precious metal.

The metal can be a Group IA (or Group 1) element such as Lithium (Li), Sodium (Na), Potassium (K), Rubidium (Rb), Caesium (Cs) or Francium (Fr); a Group IIA (or Group 2) element, such as Beryllium (Be), Magnesium (Mg), Calcium (Ca), Strontium (Sr), Barium (Ba) or Radium (Ra); a transition metal such as Scandium (Sc), Titanium (Ti), Vanadium (V), Chromium (Cr), Manganese (Mn), Iron (Fe), Cobalt (Co), Nickel (Ni), Copper (Cu), Zinc (Zn)Yttrium (Y), Zirconium (Zr), Niobium (Nb), Molybdenum (Mo), Ruthenium (Ru), Rhodium (Rh), Palladium (Pd) and Silver (Ag), Lanthanum (La), Hafnium (Hf), Tantalum (Ta), Tungsten (W), Rhenium (Re), Osmium (Os), Iridium (Ir), Platinum (Pt), Gold (Au); or a metal such as Aluminum (Al), Gallium (Ga), Indium (In), Tin (Sn), Thallium (TI), Lead (Pb), or Bismuth (Bi).

In specific embodiments, the metal can be calcium (Ca) or aluminum (Al).

Compound

As used herein, "compound" is understood in the standard usage in the chemical arts. A compound is a pure chemical substance consisting of two or more different chemical elements that can be separated into simpler substances by chemical reactions. Chemical compounds have a unique and defined chemical structure; they consist of a fixed ratio of atoms that are held together in a defined spatial arrangement by chemical bonds. Chemical compounds can be molecular compounds held together by covalent bonds, salts held together by ionic bonds, intermetallic compounds held together by metallic bonds, or complexes held together by coordinate covalent bonds. As used herein, a "compound" can be a pure chemical element.

Metal-Containing Compound.

In some embodiments, the compound comprising the metal can be selected from any compound comprising the metal. In some embodiments, the compound comprising the metal can be the pure, or substantially pure, metal itself. The compound comprising the metal can be a compound comprising the metal and at least one other element. For example, the compound comprising the metal can be a compound comprising the metal and at least two other elements. As another example, the compound comprising the metal can be a compound comprising the metal and at least three, at least four, at least five or more other elements.

In specific embodiments, the compound comprising the metal can be a compound comprising calcium and at least one other element. The compound comprising the metal can be a compound comprising calcium and at least two other elements. The compound comprising the metal can be a compound comprising calcium and at least three, at least four, at least five or more other elements. For example, the compound comprising the metal can be Ca, CaO, or $CaCO_3$. As another example, the compound comprising the metal can be $CaCO_3$.

In specific embodiments, the compound comprising the metal can be a compound comprising aluminum and at least one other element. The compound comprising the metal can be a compound comprising aluminum and at least two other elements. The compound comprising the metal can be a compound comprising aluminum and at least three, at least four, at least five or more other elements. For example, the compound comprising the metal can be Aluminum hydroxide [$Al(OH)_3$], Aluminum Borate [$Al_3(BO_3)_4$], Aluminum oxide ($Al_2O_3$), Aluminum borohydrite, or salts of Aluminum. As another example, the compound comprising the metal can be $CaCO_3$, $ZrO_2$, or $Al_2O_3$.

A metal-containing compound can be in any form suitable for a carbon-coating reaction described herein. For example, a metal-containing compound can be in the form of a powder, e.g., a milled powder.

Boron-Containing Compound.

In some embodiments, the compound comprising boron can be selected from any chemical compound comprising boron. In some embodiments, the compound comprising boron can be the pure, or substantially pure, boron itself. The compound comprising boron can be a compound comprising boron and at least one other element. In some embodiments, the compound comprising boron can be a compound comprising boron and at least two other elements. The chemical compound comprising boron can be a compound comprising boron and at least three, at least four, at least five or more other elements. For example, the compound comprising boron can be B, $B_4C$ (i.e., boron carbide), $B_2O_3$, or $H_3BO_3$ (i.e., boric acid) As another example, the compound comprising boron can be $H_3BO_3$.

A boron-containing compound can be in any form suitable for a carbon-coating reaction described herein. For example, a boron-containing compound can be in the form of a powder, e.g., a milled powder.

Carbon Source

Provided herein is a reaction or series of reaction in which a carbon source is provided in a reaction with a metal-containing compound and a boron-containing compound. The carbon source can be, for example, a carbon source added as a component of the reaction (e.g., carbon black). The carbon source can be, for example, provided as a coating on the metal-containing compound or the boron-containing compound. A carbon source Ca be included in various steps of the reaction, including the carbon coating step or the reacting step, described further herein.

A carbon source can be provided in an amount suitable for formation of a metal boride. For example, a carbon source can be provided in an amount sufficient to provide an amount of carbon corresponding to a stoichiometric equation for formation of metal boride from the metal-containing compound and the boron-containing compound. As another example For example, a carbon source can be present in a coating step or a reacting step, or a combination thereof, in an amount according to a stoichiometric equation describing formation of a metal boride from such precursors (e.g., $2CaCO_3+3B_4C+C \rightarrow 2CaB_6+6CO$) (e.g., $6H_3BO_3+CaCO_3+11C \rightarrow CaB_6+9H_2O+12CO$). One of ordinary skill can determine the stoichiometric equation for a carbon source given any particular metal-containing compound, boron-containing compound, and metal boride. As another example, a carbon source can be supplied in excess of a metal-containing compound or a boron-containing compound (e.g., about 1.5×, about 2×, about 2.5×, about 3×, about 3.5×, about 4×, about 4.5×, about 5×, about 6×, about 7×, about 8×, about 9×, about 10×, or more). The amount of carbon supplied can be a mixture of carbon present as a coating on one or both of the metal-containing compound o the boron-containing compound and carbon supplied during the reaction step (e.g., as carbon black).

Coating Step

A method described herein can include carbon-coating of one or more compounds. Carbon-coating can be accomplished by decomposing a hydrocarbon gas in the presence of the compounds (e.g., a metal-containing compound or a boron-containing compound) that are desired to be coated. Decomposing a hydrocarbon gas can be referred to as pyrolysis of a hydrocarbon gas. The process of decomposing the hydrocarbon gas is also referred to as "cracking" the hydrocarbon gas.

The carbon-coating step can include decomposing a hydrocarbon gas in the presence of a compound comprising a metal. The carbon-coating step can include decomposing a hydrocarbon gas in the presence of a compound comprising boron. The carbon-coating step can include decomposing a hydrocarbon gas in the presence of both a compound comprising a metal and a compound comprising boron. In some embodiments, a method for synthesis of a metal boride can include providing a compound comprising a metal; providing a compound comprising boron; and decomposing a hydrocarbon gas in the presence of the compound comprising a metal or the compound comprising boron.

Decomposing a hydrocarbon gas in the presence of a compound comprising a metal, a compound comprising boron, or both, can result in the compound(s) becoming coated with carbon. This process of decomposing a hydrocarbon can be referred to as "carbon-coating" the compound comprising a metal, the compound comprising boron, or both.

Where a carbon coating step employs both a metal-containing compound and a boron-containing compound, each can be present over a range of ratios. For example, metal-containing compound and a boron-containing compound can be present in a carbon coating step at a ratio according to a stoichiometric equation describing formation of a metal boride from such precursors (e.g., $2CaCO_3+3B_4C+C\rightarrow 2CaB_6+6CO$) (e.g., $6H_3BO_3+CaCO_3+11C\rightarrow CaB_6+9H_2O+12CO$). One of ordinary skill can determine the stoichiometric equation for any particular metal-containing compound, boron-containing compound, and metal boride. As another example, a metal-containing compound can be supplied in excess of a boron-containing compound (e.g., about 1.5x, about 2x, about 2.5x, about 3x, about 3.5x, about 4x, about 4.5x, about 5x, about 6x, about 7x, about 8x, about 9x, about 10x, or more). As another example, a boron-containing compound can be supplied in excess of a metal-containing compound (e.g., about 1.5x, about 2x, about 2.5x, about 3x, about 3.5x, about 4x, about 4.5x, about 5x, about 6x, about 7x, about 8x, about 9x, about 10x, or more).

In the first step of the synthesis of a metal boride, a hydrocarbon gas (or a gas mixture of two or more hydrocarbons) can be decomposed in the presence of a compound comprising a metal, a compound comprising boron, or both. A hydrocarbon is generally understood as an organic compound consisting entirely of hydrogen and carbon. A hydrocarbon can be, for example, a saturated hydrocarbon, an unsaturated hydrocarbon, a cycloalkane, or an aromatic hydrocarbon.

Any hydrocarbon that forms a gas can be used in the coating step described herein. A hydrocarbon gas for use in a coating step described herein can be, for example, methane, ethane, propane, butane, propylene, butadiene (e.g., 1,3 Butadiene), acetylene, allene, butene, neopentane, ethylene, methylacetylene, or natural gas. For example, a hydrocarbon gas that is decomposed in the presence of a compound comprising a metal, a compound comprising boron, or both can be propylene.

A carbon-coating step can occur at one or more predetermined temperatures, one or more predetermined atmospheric pressures, or one or more predetermined atmospheric gas compositions. In a carbon-coating step, a metal-containing compound or a boron-containing compound can be introduced into a reaction chamber capable of maintaining a predetermined temperature, a predetermined atmospheric pressure, or a predetermined atmospheric gas composition. For example, a reaction chamber can be a furnace (e.g., a Carbolite Rotary Reactor furnace). A carbon-coating step can occur over one or more cycles each of the same or different predetermined amount of time.

In the carbon-coating step, a hydrocarbon gas can be provided at a predetermined pressure. For example, a hydrocarbon gas can be provided in a carbon-coating reaction at a pressure of at least about 15 psi up to about 50 psi. For example, a hydrocarbon gas can be provided at a pressure of about 15, about 20 psi, about 25 psi, about 26 psi, about 27 psi, about 28 psi, about 29 psi, about 30 psi, about 31 psi, about 32 psi, about 33 psi, about 34 psi, about 35 psi, about 36 psi, about 37 psi, about 38 psi, about 39 psi, about 40 psi, about 45 psi, about 50 psi, or more. A carbon-coating reaction can include two or more predetermined pressures. For example, a first pressure at beginning of a reaction can be a vacuum or near vacuum, a second pressure can be a low pressure (e.g., about 20 psi) in which an atmospheric gas (e.g., an inert atmospheric gas) is introduced, a third pressure can be an elevated pressure at which pyrolysis or cracking occurs (e.g., about 35 psi). A vacuum or near vacuum can occur between cycles when hydrocarbon gas is evacuated.

A carbon-coating step described herein can occur at a predetermined temperature, such as a temperature that is above room temperature. For example, the carbon-coating reaction can occur at a temperature of at least about 100 degrees C. up to about 1000 degrees C. As another example, the carbon-coating reaction can occur at a temperature of about 100 degrees C., about 200 degrees C., about 300 degrees C., about 400 degrees C., about 450 degrees C., about 460 degrees C., about 470 degrees C., about 480 degrees C., about 490 degrees C., about 500 degrees C., about 510 degrees C., about 520 degrees C., about 530 degrees C., about 540 degrees C., about 550 degrees C., about 560 degrees C., about 570 degrees C., about 580 degrees C., about 590 degrees C., about 600 degrees C., about 610 degrees C., about 620 degrees C., about 630 degrees C., about 640 degrees C., about 650 degrees C., about 700 degrees C., about 800 degrees C., about 900 degrees C., about 1000 degrees C., or more.

A carbon-coating reaction(s) described herein can be performed under an inert atmosphere. An inert atmosphere can be, for example, an atmosphere flushed with argon. An inert atmosphere can be, for example, an atmosphere flushed with nitrogen. Other inert atmosphere compositions will be known to one skilled in the art. An inert atmospheric composition can be introduced into a chamber in which the coating reaction is to be performed before, concurrent with, or after the temperature in the chamber is raised to a predetermined temperature. An inert atmospheric composition can be introduced into a chamber in which the coating reaction is to be performed before, concurrent with, or after atmospheric pressure has been changed to a predetermined atmospheric pressure. An inert atmospheric composition can be introduced between one or more reaction cycles. For example, an inert atmospheric composition can be introduced every second cycle, every third cycle, every fourth cycle, every fifth cycle, etc.

A carbon-coating step described herein can occur for a predetermined amount of time. For example, the carbon coating reaction can continue for at least about 10 minutes up to about 30 minutes. As another example, the carbon coating reaction can continue for about 10 minutes, about 11 minutes, about 12 minutes, about 13 minutes, about 14 minutes, about 15 minutes, about 16 minutes, about 17 minutes, about 18 minutes, about 19 minutes, about 20 minutes, about 21 minutes, about 22 minutes, about 23 minutes, about 24 minutes, about 25 minutes, about 26 minutes, about 27 minutes, about 28 minutes, about 29 minutes, about 30 minutes, or more. A predetermined amount of time for a carbon-coating reaction can be the same or different between multiple cycles.

A carbon-coating step described herein can include a plurality of cycles. One cycle of a carbon-coating reaction can be reaction of a metal-containing compound or a boron-containing compound with a hydrocarbon gas for a predetermined amount of time followed by evacuation of the hydrocarbon gas, or residuals thereof. After evacuation, introduction of a new volume of hydrocarbon gas can start a second cycle. For example, the carbon-coating step can include at least about 2 cycles up to about 35 cycles. As another example, the carbon-coating step can include about 5 cycles, about 6 cycles, about 7 cycles, about 8 cycles, about 9 cycles, about 10 cycles, about 11 cycles, about 12 cycles, about 13 cycles, about 14 cycles, about 15 cycles, about 16 cycles, about 17 cycles, about 18 cycles, about 19 cycles, about 20 cycles, about 21 cycles, about 22 cycles, about 23 cycles, about 24 cycles, about 25 cycles, about 26 cycles, about 27 cycles, about 28 cycles, about 29 cycles, about 30 cycles, about 31 cycles, about 32 cycles, about 33 cycles, about 34 cycles, about 35 or more of carbon coating. A cycle of a carbon-coating reaction can occur at the same or different predetermined temperature, predetermined atmospheric pressure, predetermined atmospheric gas composition, or predetermined amount of time as other cycles of the carbon-coating reaction.

The metal-containing compound or the boron-containing compound can be seeded before, concurrent with, or after the carbon coating reaction. Seeding can improve the morphology of the metal bromide particles produced by reacting carbon-coated compounds. Seeding can be accomplished by, for example, adding about 1% Fe or about 1% Ni to the metal-containing compound or the boron-containing compound.

A carbon-coating reaction can include various combinations of any of the above materials or parameters in any order. For example, a metal-containing compound or a boron-containing compound can be introduced into a reaction chamber; an inert atmosphere can be created (e.g., chamber is flushed with an inert gas, e.g., argon, and evacuated multiple times); a first predetermined atmospheric pressure can be established (e.g., about 20 psi argon); a predetermined temperature can be established (e.g., about 550 degrees C.); a second predetermined atmospheric pressure can be established or maintained (e.g., about 35 psi argon); a first volume of hydrocarbon gas (e.g., propylene at, e.g., about 30 psi) can be introduced into the chamber; the reaction can be allowed to proceed for a predetermined amount of time of one cycle (e.g., about 20 minutes); the hydrocarbon gas can pyrolize or crack, thereby depositing a carbon coating on the surface of the metal-containing compound or the boron-containing compound; and the chamber can be evacuated or substantially evacuated of hydrocarbon gas. A plurality of coating cycles can be performed by introducing, e.g., another volume of hydrocarbon gas (e.g., a second volume of hydrocarbon gas in a second cycle) can be introduced into the chamber; the chamber can be maintained at the same or different predetermined temperature, at the same or different predetermined pressure for the same or different predetermined amount of time; and the chamber can be periodically flushed with an inert atmospheric gas preceding introduction of a volume of hydrocarbon gas (e.g., argon flush after every third cycle). In such fashion, a carbon-coating step can occur over a plurality of carbon-coating reaction cycles. After a last cycle, the chamber can be evacuated or substantially evacuated of hydrocarbon gas and the reacted compounds allowed to cool, optionally under an inert atmosphere. The above described sequence is exemplary and can include any combination of metal-containing compound, boron-containing compound, inert atmosphere, atmospheric pressure, temperature, hydrocarbon gas, number of cycles, amount of reaction cycle time, amount of total reaction time, period of flush, and cooling time discussed herein.

Carbon-coated compounds (e.g., a carbon-coated metal-containing compound or a carbon-coated boron-containing compound) described herein can be milled (e.g., in a Spex 8000 miller). Milling of carbon-coated compounds can be done, for example, in the presence of one or more other compounds, such as carbon black. Carbon black is generally understood to be a form of amorphous carbon that has a high surface-area-to-volume ratio, although its surface-area-to-volume ratio is low compared to that of activated carbon. Carbon black is a non-conductive material due to its volatile content.

Reacting Step

A method described herein can include reacting a carbon-coated compound comprising a metal with a carbon-coated compound comprising boron. The reaction step described herein can include reacting the products of reactions in which hydrocarbon gas was decomposed in the presence of a compound comprising a metal and a compound comprising boron. The reaction step described herein can include providing a carbon-coated compound comprising a metal; providing a carbon-coated compound comprising boron; and reacting the carbon-coated compound comprising a metal with the carbon-coated compound comprising boron. The result of such reaction steps described herein can be a metal boride.

A reaction step can alternatively include reacting (i) a non-carbon-coated compound comprising a metal and a non-carbon-coated compound comprising boron; (ii) a non-carbon-coated compound comprising a metal and a carbon-coated compound comprising boron; or (iii) a carbon-coated compound comprising a metal and a non-carbon-coated compound comprising boron. Use of a non-carbon-coated compound can be desirable where a metal-containing compound or a boron-containing compound has characteristics unsuitable for the coating reaction (e.g., a low melting point). Any of the methods described herein can be adapted such that one or both of the metal-containing compound of the boron-containing compound are non-coated. For example, non-coated $CaCO_3$, $H_3BO_3$, and carbon black can be reacted at about 1500 degrees C. for about 4 hours under flowing argon in a box furnace. In some embodiments, a non-coated compound can provide stronger completion of reaction while a corresponding coated compound can provide higher surface area and better particle size.

A metal-containing compound and a boron-containing compound can be provided in a reacting step over a range of ratios. For example, a metal-containing compound and a boron-containing compound can be present in a reacting step at a ratio according to a stoichiometric equation describing formation of a metal boride from such precursors (e.g., $2CaCO_3+3B_4C+C \rightarrow 2CaB_6+6CO$) (e.g., $6H_3BO_3+CaCO_3+11C \rightarrow CaB_6+9H_2O+12CO$). One of ordinary skill can determine the stoichiometric equation for any particular metal-containing compound, boron-containing compound, and metal boride. As another example, a metal-containing compound can be supplied in excess of a boron-containing compound (e.g., about 1.5×, about 2×, about 2.5×, about 3×, about 3.5×, about 4×, about 4.5×, about 5×, about 6×, about 7×, about 8×, about 9×, about 10×, or more). As another example, a boron-containing compound can be supplied in excess of a metal-containing compound (e.g., about 1.5×, about 2×, about 2.5×, about 3×, about 3.5×, about 4×, about 4.5×, about 5×, about 6×, about 7×, about 8×, about 9×, about 10×, or more).

A reacting step can occur at one or more predetermined temperatures, one or more predetermined atmospheric pressures, or one or more predetermined atmospheric gas compositions. In a carbon-coating step, a carbon-coated metal-containing compound or a carbon-coated boron-containing compound can be introduced into a reaction chamber capable of maintaining a predetermined temperature, a predetermined atmospheric pressure, or a predetermined atmospheric gas composition. For example, a reaction chamber can be a furnace (e.g., a high temperature box furnace, such as a CM Rapid Temp 1704 Series furnace). A reacting step can occur over a predetermined amount of time.

A reacting step described herein can occur at a predetermined temperature sufficient to cause or facilitate reaction of a carbon-coated metal-containing compound and a carbon-coated boron containing compound. Reacting carbon-coated compounds to produce a metal boride can include heating the carbon-coated compounds to a temperature sufficiently high to cause or facilitate reaction. For example, reacting carbon-coated compounds can occur at a temperature of at least about 1000 degrees C. up to about 2000 degrees C. As another example, reacting carbon-coated compounds can occur at a temperature of at about 1000 degrees C., about 1100 degrees C., about 1200 degrees C., about 1300 degrees C., about 1400 degrees C., about 1500 degrees C., about 1600 degrees C., about 1700 degrees C., about 1800 degrees C., about 1900 degrees C., about 2000 degrees C., or more.

As a further example, reacting carbon-coated compounds to produce a metal boride can include heating carbon-coated $CaCO_3$ or $H_3BO_3$ to a temperature of at least about 1400 degrees C. up to about 1600 degrees C.

As a further example, reacting carbon-coated compounds to produce a metal boride can include heating the carbon-coated compounds (e.g., Aluminum hydroxide [$Al(OH)_3$], Aluminum Borate [$Al_3(BO_3)_4$], Aluminum oxide ($Al_2O_3$), Aluminum borohydrite, salts of Aluminum/Boron Carbide ($B_4C$), $H_3BO_3$) to a temperature of at least about 1400 degrees C. up to about 1600 degrees C.

A reacting step described herein can include a predetermined rate of temperature increase. For example, the temperature of the reaction step can increase at a rate of about 1 to about 10 degrees C. per minute until reaching a predetermined temperature for the reaction step. As another example, the temperature of the reaction step can increase at a rate of about 1, about 2, about 3, about 4, about 5, about 6, about 7, about 8, about 9, about 10, or more degrees C. per minute until reaching a predetermined temperature for the reacting step.

A reacting step described herein can include a predetermined rate of temperature decrease. For example, the temperature of the reaction step can decrease at a rate of about 1 to about 10 degrees C. per minute from a predetermined temperature until reaching room temperature. As another example, the temperature of the reaction step can decrease at a rate of about 1, about 2, about 3, about 4, about 5, about 6, about 7, about 8, about 9, about 10, or more degrees C. per minute from a predetermined temperature until reaching room temperature.

The reaction of the carbon-coated compounds can be performed under an inert atmosphere. An inert atmosphere can be, for example, an atmosphere flushed with argon. An inert atmosphere can be, for example, an atmosphere flushed with nitrogen. Other inert atmosphere compositions will be known to one skilled in the art. An inert atmospheric composition can be introduced into a chamber in which the reaction of carbon-coated compounds is to be performed before, concurrent with, or after the temperature in the chamber is raised to a predetermined temperature. An inert atmospheric composition can be introduced into a chamber in which the reaction of carbon-coated compounds is to be performed before, concurrent with, or after atmospheric pressure has been changed to a predetermined atmospheric pressure.

The reaction of carbon-coated compounds to produce a metal boride described herein can occur for a predetermined amount of time. For example, the reaction of the carbon-coated compounds can continue for at least about 1 hour up to about 6 hours. As another example, the reaction of the carbon-coated compounds can continue for about 1 hour, about 2 hours, about 3 hours, about 4 hours, about 5 hours, about 6 hours, or more.

The reaction of the carbon-coated compounds to produce a metal boride can be seeded. Seeding can improve the morphology of the metal bromide particles produced by the reaction of the carbon-coated compounds. Seeding can be accomplished by, for example, adding about 1% Fe or about 1% Ni to the carbon-coated compounds, and then mixing the Fe or Ni and the carbon-coated compounds (e.g., in a mechanical mixer).

A reaction step described herein can produce a metal boride. For example, a reaction step described herein can produce a calcium boride (e.g., $CaB_6$). One of ordinary skill can determine the precise metal boride formed according to the metal-containing compound and boron-containing compound precursors employed in methods described herein.

The differences between the two sources of boron and the various methods employed for the preparation of precursors produces differences in resulting metal borides. From experiments described herein, boron carbide seems to be a much tougher material to break down for the synthesis of $CaB_6$, and is a more expensive product compared to boric acid. But the yield of $CaB_6$ from this particular method was shown to be greater as compared to the boric acid reaction, which can be desirable. Another advantage that boron carbide can provide is that it is a material that can be coated unlike boric acid, which can melt in a coating reaction with propylene. It may be possible to eliminate the use of carbon black completely during the preparation of precursor from boron carbide due to the low amount of carbon required as an input, since the boron carbide itself contains quite a bit of carbon. Where such approach is taken, the quality of boron carbide being used may impact the quality of metal boride formed. For high quality $CaB_6$, one can use a higher quality boron carbide, which in turn is generally more expensive. Nevertheless, a completely carbon black free precursor could be prepared using carbon-coated-calcium carbonate, mixed with boron carbide. This mixture could then be further coated with carbon again using propylene cracking.

In the case of boric acid, it is contemplated that it may be difficult to obtain a completely carbon black free precursor. But an advantage of using boric acid is its low cost and, as shown from experiments and TEM imaging described herein, the high quality yield of CaB$_6$ from these precursors. An overall carbon coated precursor can be obtained by using a mixture of carbon coated calcium carbonate mixed with boric acid; and carbon black amounting to half of the total required carbon. This mixture can be milled and then further coated substantially to meet the carbon requirement.

It is also noted that calcium carbonate can be coated to meet some amount of the carbon requirement in each case, as shown in experiments described herein. But from boric acid reactions, it was observed that excess coatings on calcium carbonate (e.g., 30 cycles as opposed to 10 cycles) may hinder the reaction. Therefore, it is contemplated that the number of coatings on calcium carbonate can be kept relatively low, but on the overall mixture would be kept relatively high to meet the carbon requirement. The mechanisms of carbon coating using propylene cracking on each material can vary, and therefore can be tailored for each coating.

Metal Borides Produced by the Methods

One aspect provides a metal boride composition. The metal boride composition can be formed according to methods described here. A metal boride can be produced by a two-step process including, for example, first producing at least one of a carbon-coated compound comprising a metal, a carbon-coated compound comprising boron, or both; and then reacting the products of the first step to produce a metal boride.

A metal boride can be produced by carbon-coating precursors and then reacting the carbon coated precursors to form a metal boride. The coating of the precursors can include providing a compound comprising a metal; providing a compound comprising boron; decomposing a hydrocarbon gas in the presence of the compound comprising a metal and the compound comprising boron. The reaction of the carbon-coated precursors can include providing a carbon-coated compound comprising a metal; providing a carbon-coated compound comprising boron; and reacting the carbon-coated compound comprising a metal with the carbon-coated compound comprising boron to produce a metal boride.

A metal boride can be produced by providing a carbon-coated compound comprising a metal; providing a carbon-coated compound comprising boron; and reacting the carbon-coated compound comprising a metal with the carbon-coated compound comprising boron. Characteristics of a metal boride formed according to methods described herein can be assessed according to techniques and protocols known in the art. For example, X-ray diffraction can be used to determine whether a metal boride is a single phase metal boride or determine whether intermediate compounds are present with the metal boride. As another example, BET surface area can be measured to determine characteristics of the metal boride (e.g., size of particles). As another example, transmission electron microscopy can be used to determine morphology and average particle size of the metal boride.

A metal boride formed according to a method described herein can have an average particle size diameter of about 100 nm to about 1000 nm. For example, a metal boride formed according to a method described herein can have an average particle size diameter of about 100 nm, about 200 nm, about 300 nm, about 400 nm, about 500 nm, about 600 nm, about 700 nm, about 800 nm, about 900 nm, or about 1000 nm.

A metal boride formed according to a method described herein can be comprised of particles having an average specific surface area of about 0.1 to about 10 m$^2$ g$^{-1}$. For example, a metal boride formed according to a method described herein can be comprised of particles having an average specific surface area of about 0.1, about 0.5, about 1, about 1.5, about 2, about 2.5, about 3, about 3.5, about 4, about 4.5, about 5, about 5.5, about 6, about 6.5, about 7, about 7.5, about 8, about 8.5, about 9.5, or about 10 m$^2$ g$^{-1}$.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1

This example describes the coating process.

The preparation of precursors using the carbon coating process was carried out using a Carbolite Rotary Reactor furnace. A predetermined amount of powders or mixture of powders were loaded into a specially designed stainless steel vessel, and affixed on the furnace. The vessel was flushed with argon and evacuated using a vacuum pump multiple times in order to create an inert atmosphere. Once this was done, a low concentration of argon (about 20 psi) was introduced into the vessel, and the temperature was ramped up to 550° C. Whenever the pressure in the vessel went above 35 psi, a small amount of argon was let out from the outlet. Once the temperature reached 550° C., propylene ($C_3H_6$) was inlet in the system, which was the carbon coating gas. At 550° C., propylene has been described to pyrolize or crack, and deposit a low-density, amorphous and highly porous carbon coating on the surface of the powder loaded in the reactor [Reference 11]. Propylene was inlet up to a pressure of about 30 psi, and allowed to coat the surface of the powders for 20 minutes, which was counted as 1 cycle of coating. After the 20 minute cycle, propylene was evacuated from the tube, and a fresh batch of propylene was inlet. After every third cycle, the reactor tube vessel was flushed with argon, before the propylene was inlet for the following cycle. After the last cycle, the propylene was evacuated and the powders were allowed to cool down under argon. Therefore, on various powders, various numbers of coating cycles have been performed and discussed.

Example 2

This example describes the synthesis of coated powders. Unless otherwise described, materials and methods are as in Example 1.

Carbon-coated precursors were drawn from the coating reactor, and if required, they were mixed with additional powders such as carbon black in a polystyrene vial, and milled in a Spex 8000 miller for 20 minutes using methyl methacrylate balls as the milling media.

The final mixed powders of a predetermined weight were placed in an open-top graphite crucible, and placed in a high temperature box furnace (CM Inc. Rapid Temp 1704 Series). The mixed powders were then ramped to a desired temperature (1600° C., 1500° C., 1400° C.) at a heating and cooling rate of 4° C./min under continuous argon flow. After a desired holding time (usually 4 hours), the powders were drawn and weight loss was determined. They were then collected and stored in a polystyrene vial for further characterization and analysis.

Example 3

This example describes the characterization of powders. Unless otherwise described, materials and methods are as in Examples 1-2.

Precursors or synthesized powders were characterized using X-Ray Diffraction ("XRD"), performed in a Rigaku Miniflex using Cu Kα radiation at 2°/min from 20° to 70°. Using XRD patterns, it was determined whether if the synthesized powders were single phase $CaB_6$ or not. In the event they were not, intermediate compounds could be readily seen.

Brunauer, Emmett, and Teller ("BET") surface area of precursors and synthesized powders were measured using a Micromeritics Gemini 2360 using N2 adsorption at −77K. Samples were degassed at about 165° C. overnight prior to the surface area analysis. The surface area measurements gave an excellent idea on the characteristics of the synthesized powders, because lower surface area correlates to larger particle sizes.

The morphology of the powders, and average particle sizes were determined using transmission electron microscopy ("TEM") imaging, conducted on a Hitachi H7650. Energy-dispersive X-ray spectroscopy ("EDX") was also performed on some samples, which was done using a Hitachi S2460N.

Example 4

This example describes the preparation of $CaB_6$ using the Boron Carbide method. Unless otherwise described, methods are as in Examples 1-3.

The stoichiometric equation in Equation 1 describes the synthesis of calcium hexaboride from calcium carbonate and boron carbide and carbon. The calcium carbonate used was obtained from Minerals Technologies and was of the Vicality Extra Light variety. The boron carbide utilized was obtained from HC Starck, and was of the Grade HS type. Carbon black, if used, was obtained from Cabot Corporation, and was of the Monarch 880 type. However, the main source of carbon was desired to be pyrolized carbon from propylene.

$$2CaCO_3 + 3B_4C + C \rightarrow 2CaB_6 + 6CO \qquad (Eq\ 1)$$

Experiments to synthesize calcium hexaboride using the boron carbide method described in Equation 1 were performed. Three batches of precursors were prepared as follows. The first batch of precursors was made by mixing $CaCO_3$ and $B_4C$ based on the ratios from the stoichiometric equation (Equation 1), and then placing the precursors in the reactor tube for coating using the carbolite coating reactor. The mixed $CaCO_3$ and $B_4C$ were coated over 12 cycles. After coating, it was determined that the amount of carbon deposited was not enough based on the lack of weight gain, and subsequently synthesis of these powders did not produce single phase $CaB_6$.

The second batch of precursors was prepared by mixing carbon-coated-$CaCO_3$ with the required amount of $B_4C$. The $CaCO_3$ was coated with 24 cycles of propylene gas at 550° C. Two small samples of 24-cycle coated $CaCO_3$ were placed in alumina crucibles, and placed in an oven where they were baked at 600° C. in air for 2 hours in order to burn off the carbon and get an approximate weight percentage of carbon. The weight loss was found to be about 7%; however after collecting a XRD spectrum of this sample, it was found that the $CaCO_3$ underwent calcination, and therefore this weight percentage could not be deemed accurate. It must be emphasized that the XRD spectrum carbon coated calcium carbonate did not undergo calcinations; the sample that was burnt off did. The precursor from this batch, i.e. 24-cycle coated $CaCO_3$ mixed with $B_4C$ when synthesized at 1600° C. under flowing argon in the box furnace did not yield single phase $CaB_6$ either.

A third batch of precursor was prepared. Here, the exact amounts of $CaCO_3$, $B_4C$ and carbon black were taken and mixed together. This mix ensured that there was no carbon deficiency in the precursor. Following this, this mixture was coated with 20 cycles of carbon using propylene cracking at 550° C. in the reactor tube. The precursors were then reacted at 1600° C., 1500° C. and 1400° C. under flowing argon for 4 hours, and XRD spectrums shown in FIG. 1 from this batch showed successful synthesis of $CaB_6$ at 1600° C. There were some intermediates synthesized at the reaction temperature of 1500° C., while synthesis at 1400° C. clearly showed an incomplete reaction with many intermediates present. The weight losses obtained from the synthesis reactions at the three temperatures were 38.69%, 35.03% and 29.43% respectively. All three of these fell below the required loss of 44.46%, which indicated that it was possible for more complete formation of $CaB_6$ from these experiments. The BET surface area measurements of the three samples were 3.5, 4, and 8 $m^2$ $g^{-1}$ respectively. The difference in surface area between the 1600° C. and 1500° C. sample was not much different, also indicating that the formation at 1600° C. was not as strong as it could have been. This could be because boron carbide happens to be a tougher material to break down to extract boron for reaction. A holding time longer than 4 hours may be required for this reaction to completely take place. However, from all the results, the synthesis reaction at 1600° C. from the carbon-coated $CaCO_3$, $B_4C$ precursors prepared in the presence of carbon black gave the most intense XRD spectrum, indicating single phase, chemically pure $CaB_6$ production.

Figure 2A:
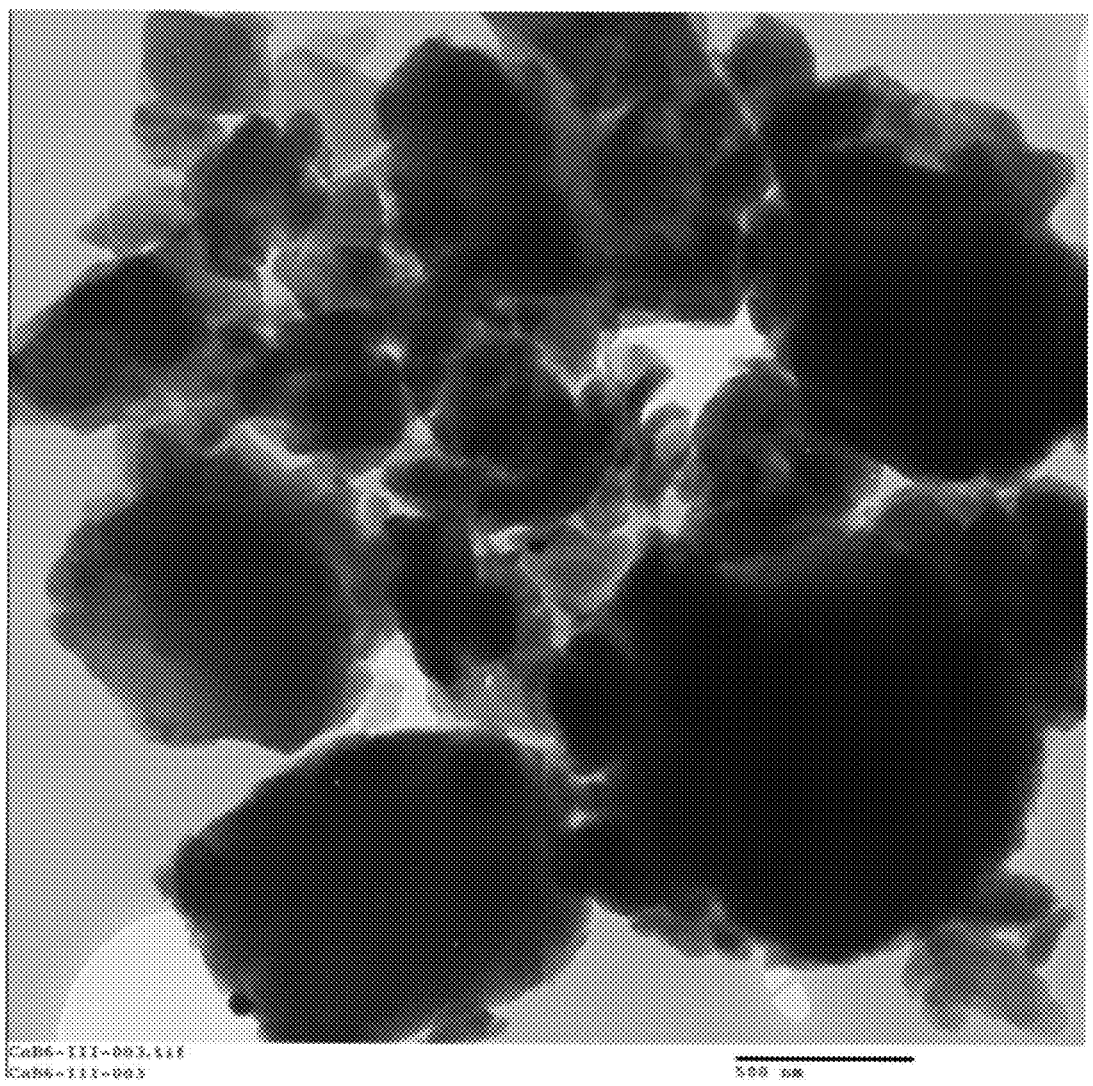
FIG. 2A shows particles of $CaB_6$ from ($CaCO_3+B_4C+C$-black) coated for 20 cycles at 1600 degrees C.
Figure 2B:
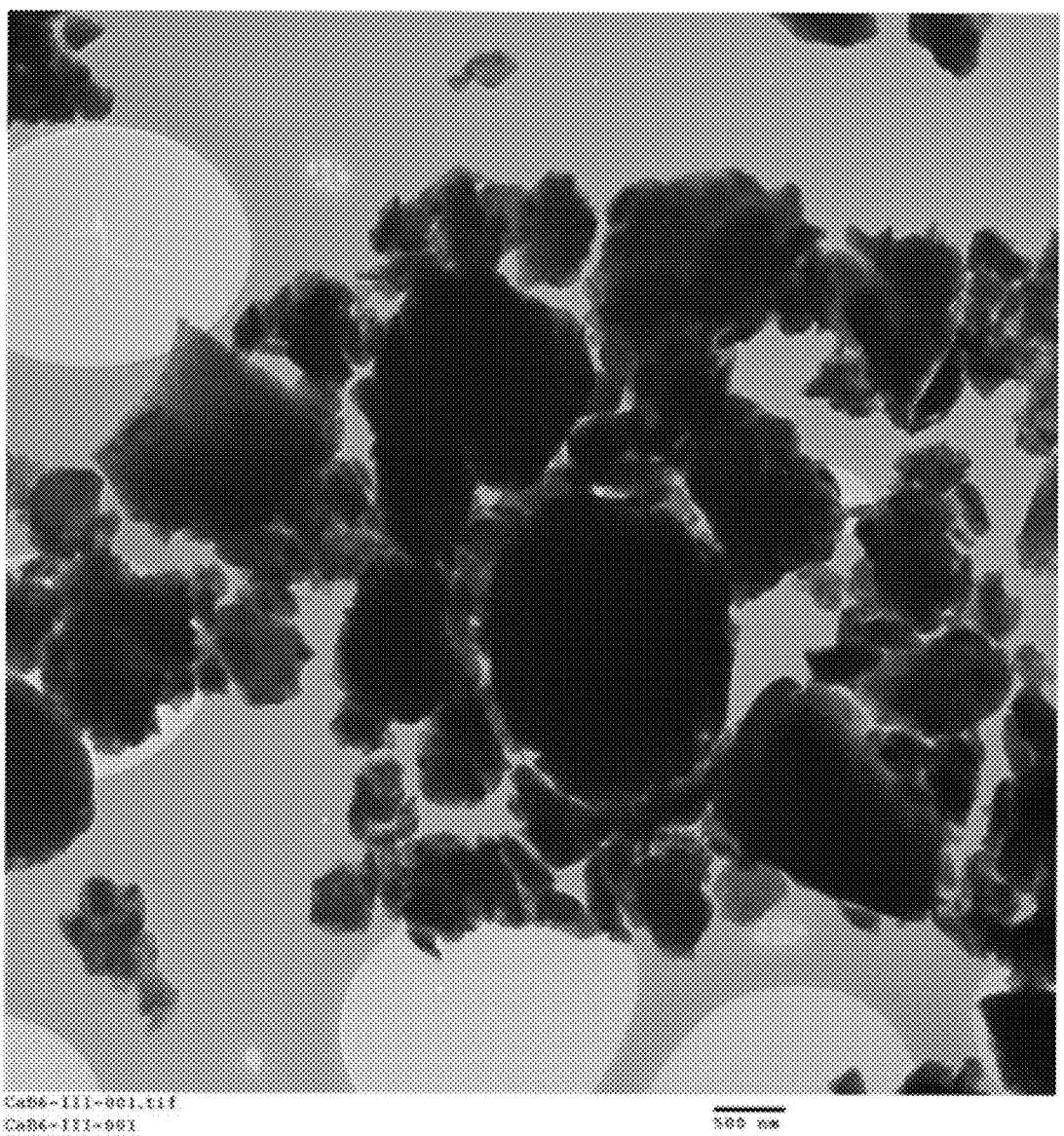
FIG. 2B shows particles of $CaB_6$ from ($CaCO_3+B_4C+C$-black) coated for 2-cycles at 1066 degrees C.

TEM imaging of the 1600° C. sample prepared from this precursor is shown in FIGS. 2a and 2b, showing relatively uniform particle morphology. The particle sizes are about 500 nm in diameter. The relatively large particles are also supporting the fact that it is possible that the reaction could have gone further to produce finer particles.

Example 5

This example describes the preparation of $CaB_6$ using boric acid. Unless otherwise described, the methods are as in Examples 1-4.

In this section of research, studies were conducted to prepare $CaB_6$ by employing boric acid (obtained from Spectrum, and of the BO110 variety) as the source of boron. Although the yield of $CaB_6$ from the stoichiometric from the reaction shown in Equation 2 is substantially less, at about 17.4%, thermodynamic data indicates that this reaction can be completed at much lower temperatures. Another advantage of using boric acid is its lower cost.

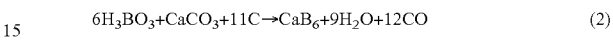

$$6H_3BO_3+CaCO_3+11C \rightarrow CaB_6+9H_2O+12CO \quad (2)$$

The first batch of precursor developed for this method was created by mixing boric acid and calcium carbonate and carbon black in required amounts, and mixing them. No coating was performed on these precursors. These precursors yielded single phase $CaB_6$ when reacted at 1600° C. and 1500° C. as well. The XRD spectrums of these 2 samples can be seen in FIGS. 3 and 4, as the non-coated samples. The yields of $CaB_6$ from these 2 samples were 15.84% and 15.15% respectively, below the 17.4% yield indicated from thermodynamic data. This indicated completion of the reaction.

Carbon coated precursor was attempted to be developed. This was done by mixing boric acid and calcium carbonate in required amounts in the reactor tube, and coated with carbon at 550° C. This process however did not work, as the mixture had solidified. This was due to melting of boric acid owing to its low melting point of <200° C.

Therefore, unlike boron carbide, it was determined that boric acid is not a material most preferably used for carbon coating using the coating reactor. The following experiments utilize carbon-coated calcium carbonate mixed with boric acid and carbon black.

The first attempt made was to use calcium carbonate that was coated over 30 cycles. Another batch of coated $CaCO_3$ was prepared, which was coated with 10 cycles of propylene cracking. The surface area of calcium carbonate upon coating seems to decrease as the number of cycles were increased; as the surface area of non-coated $CaCO_3$ was found to be 9 $m^2$ $g^{-1}$, 10-cycle coated $CaCO_3$ was found to be 6 $m^2$ $g^{-1}$, and 30-cycle coated $CaCO_3$ was 5 $m^2$ $g^{-1}$. The precursor batches comprising non-coated $CaCO_3$ and 30-cycle coated $CaCO_3$ were reacted with boric acid and carbon black at 1600° C. for 4 hours, with the ramping rates and cooling rates controlled at 4° C./min. The batch utilizing 10-cycle coated $CaCO_3$ was also meant to be processed under the same conditions, but after 3 hours of holding at 1600° C., the furnace failed, and the sample had rapidly cooled. The XRD spectrum (shown in FIG. 3) however shows single phase $CaB_6$ and therefore is included here.

Figure 3:
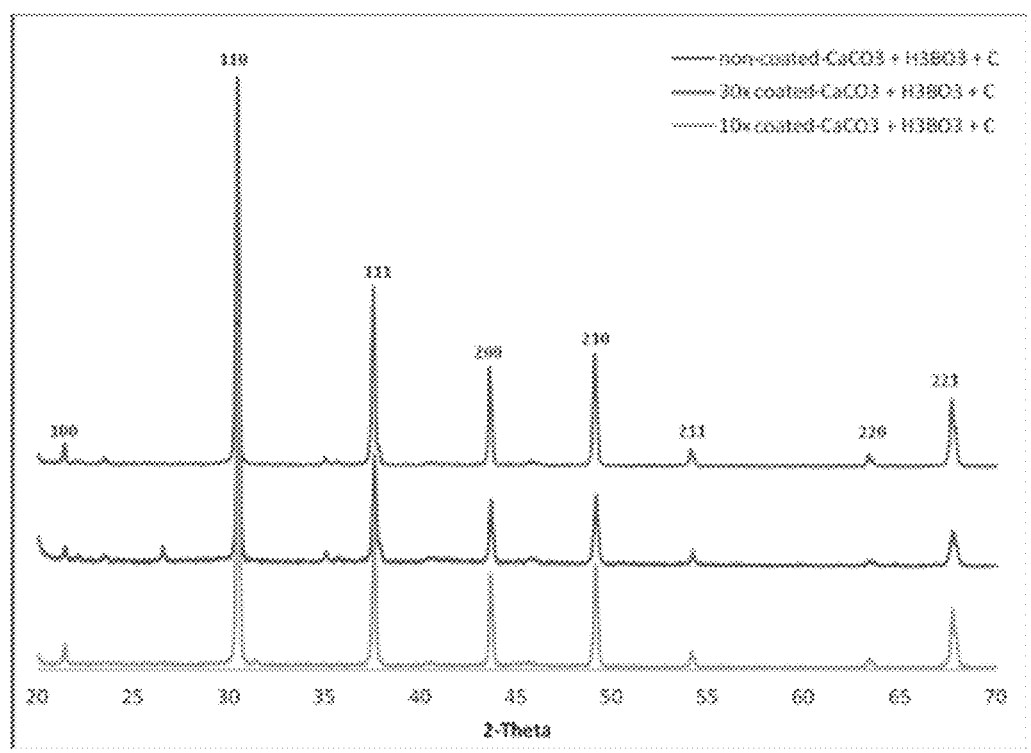
FIG. 3 is a line drawing showing an XRD spectrum of the effect of carbon coating on $CaCO_3$ for the preparation of $CaB_6$ at 1600 degrees C.

X-ray diffraction spectra of calcium hexaboride prepared from the three batches of precursors prepared at 1600° C. are provided in FIG. 3. The discussion following also includes description of TEM images of these samples, which are provided in FIGS. 4, 5 and 6, and show $CaB_6$ prepared from non-coated $CaCO_3$ based precursor, 30-cycle-coated-$CaCO_3$ based precursor, and 10-cycle-coated-$CaCO_3$ based precursors respectively, all synthesized at 1600° C.

Figure 4A:
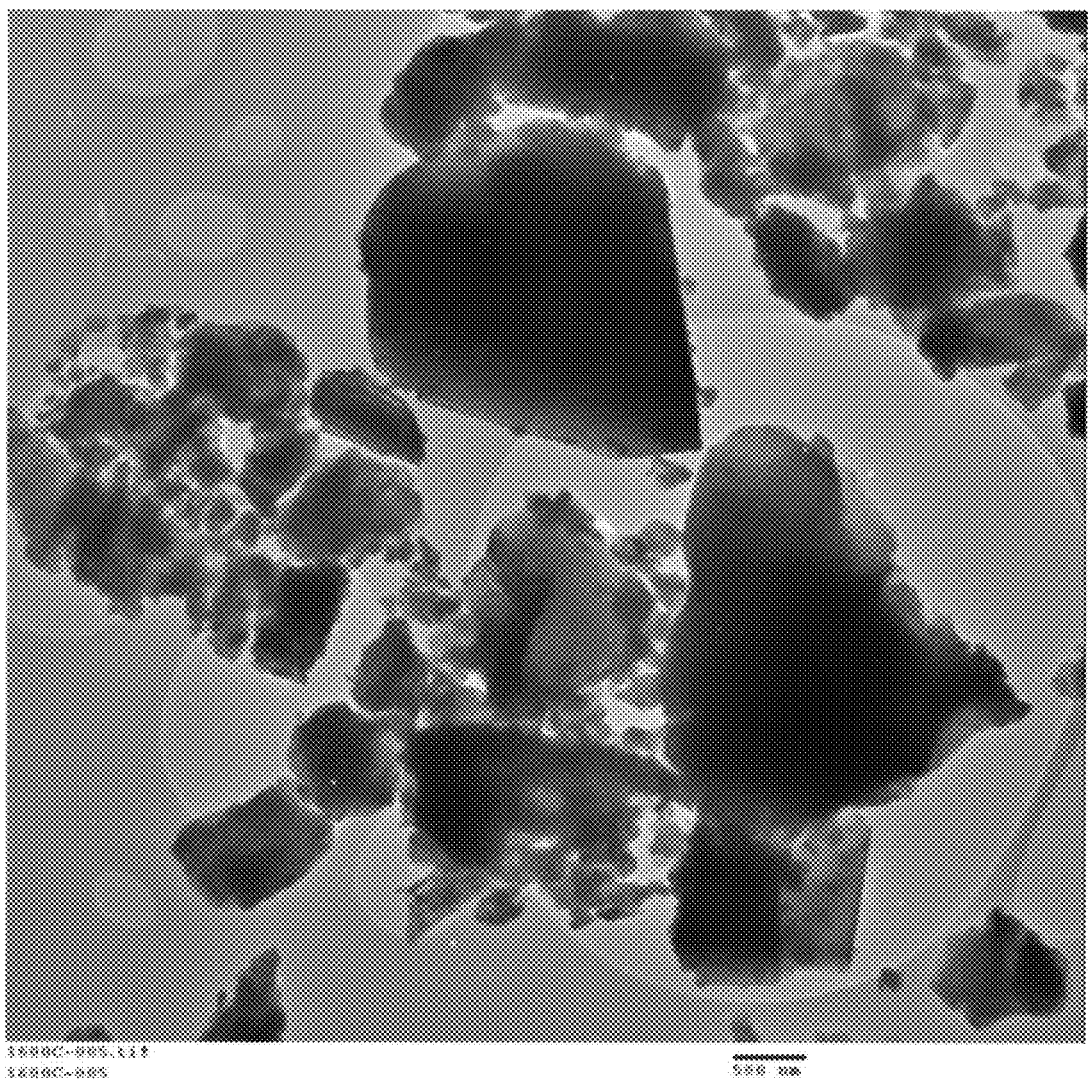
FIG. 4A shows non-coated $CaCO_3$ based $CaB_6$.
Figure 4B:
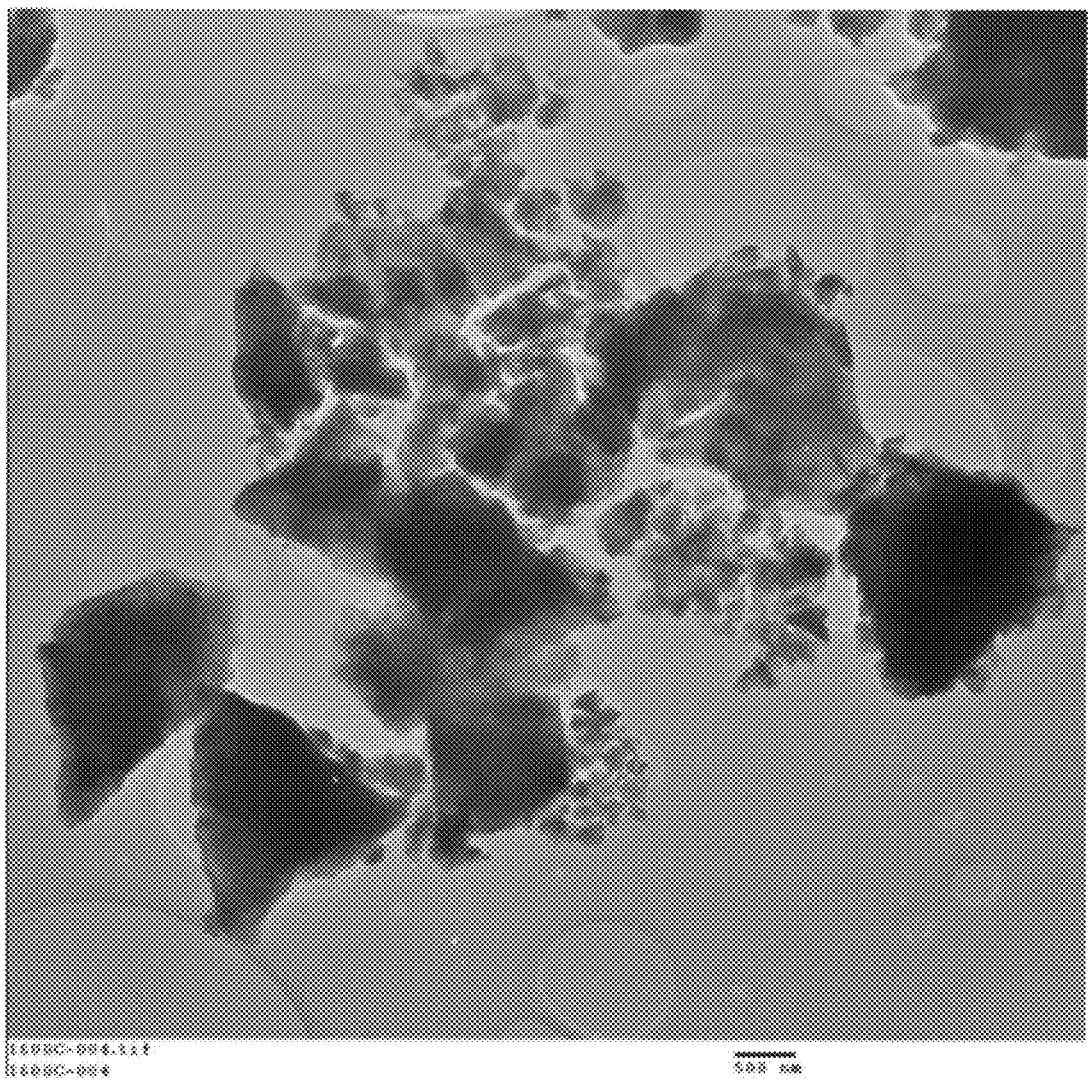
FIG. 4B shows non-coated $CaCO_3$ based $CaB_6$.
Figure 5A:
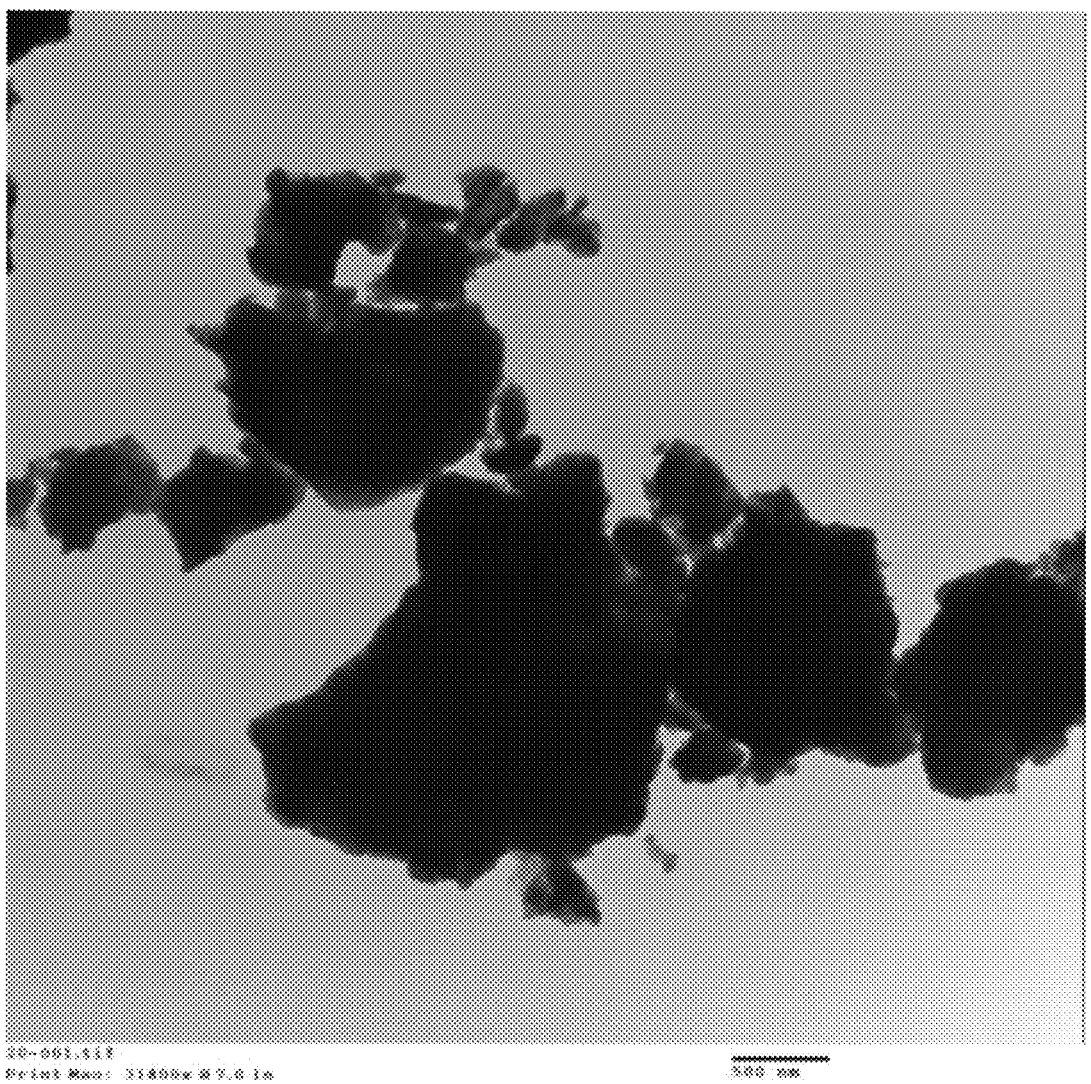
FIG. 5A shows 30× coated $CaCO_3$ based $CaB_6$.
Figure 5B:
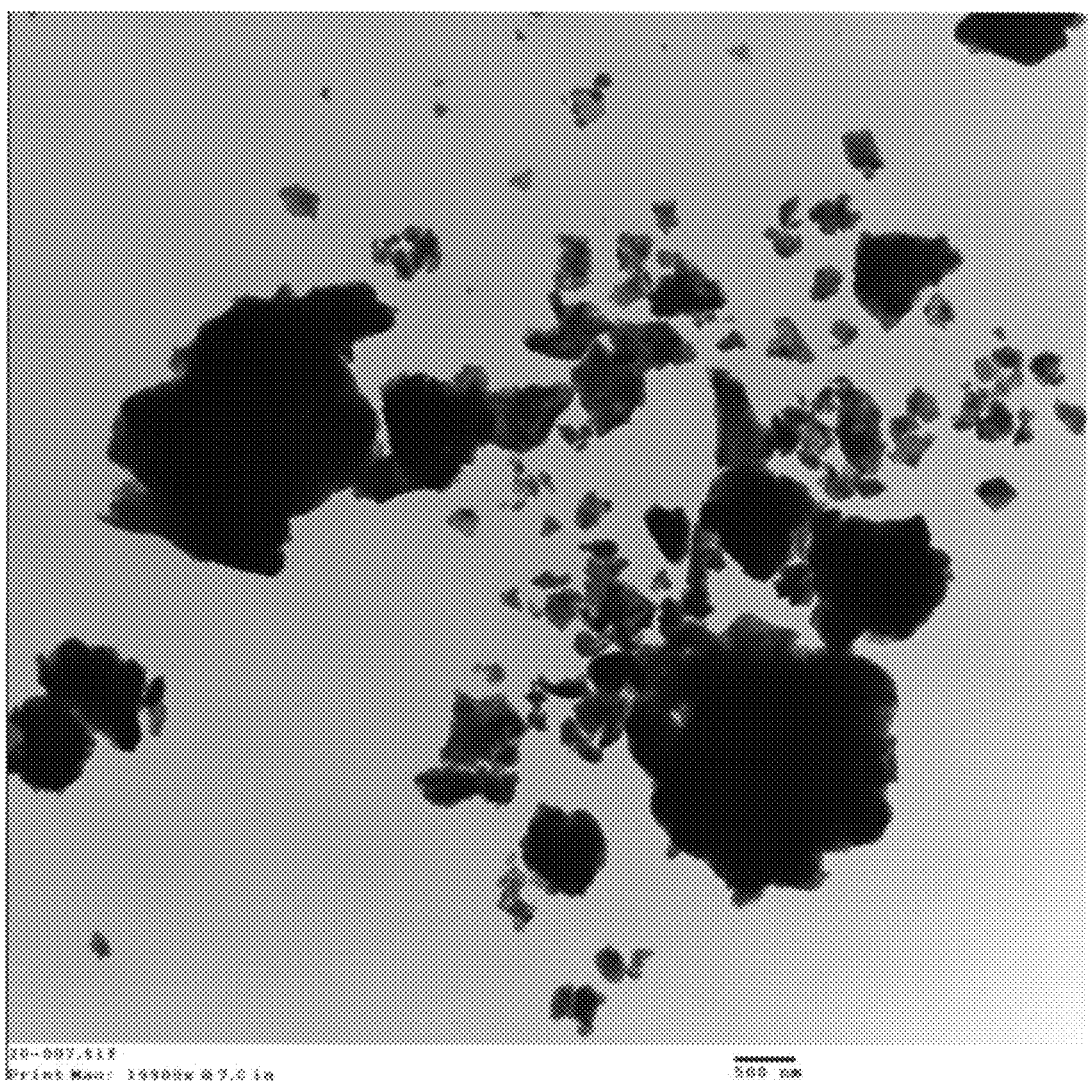
FIG. 5B shows 30× coated $CaCO_3$ based $CaB_6$.

The XRD spectrum shown in FIG. 3 compares calcium hexaboride prepared using a mixture of boric acid, carbon black, and three varieties of calcium carbonate. It can be seen that the most intense 110 peak of $CaB_6$ occurs using non-coated calcium carbonate, which indicates pretty strong completion of the reaction, which is reaffirmed by the weight loss after the reaction, which was 84.16%, greater than the required 82.60%. However, here, a few tiny peaks which are not indexed are also found, which indicates the presence of oxides of calcium or some form of boron, which did not react completely from the precursor material to form calcium hexaboride. In addition, TEM analysis of this sample, provided in FIG. 4 also shows that, on average most particles are about 1 micron in diameter. FIG. 4a indicates that particle shape is not well defined here, even though there were a few agglomerates of particles of oval or random shapes, which can be seen in FIG. 4b. In addition, the specific surface area of the non-coated $CaB_6$ was found to be 1 $m^2 g^{-1}$. The extremely low surface area also indicates a larger particle size.

Upon analysis of the sample synthesized from the 30-cycle-coated-$CaCO_3$+$H_3BO_3$+C, we find that the XRD spectra is not as clean, and contains a few extra peaks. Since this sample contains the highest amount of carbon, as it contains the same amount of carbon black in addition to the 30 cycle carbon coating as compared to the other samples, there could be a possibility that excess coating of carbon on the surface of $CaCO_3$ may be hindering the reaction mechanism. The weight loss from the 1600° C. reaction was 83.32%, which does indicate completion of the reaction, but the XRD spectrum is not as convincing as desired. Moreover, the TEM imaging also shows that the overall particle size of this material is quite large as compared to the other two samples, especially in FIG. 5a. The morphology of the particles is also not very well defined, as we see more cloud like structures in FIG. 5b. The specific surface area of this sample was found to be 4 $m^2 g^{-1}$, which shows a comparatively larger surface area. This could owe more to higher carbon content rather than an indication of overall smaller particle sizes.

Figure 6A:
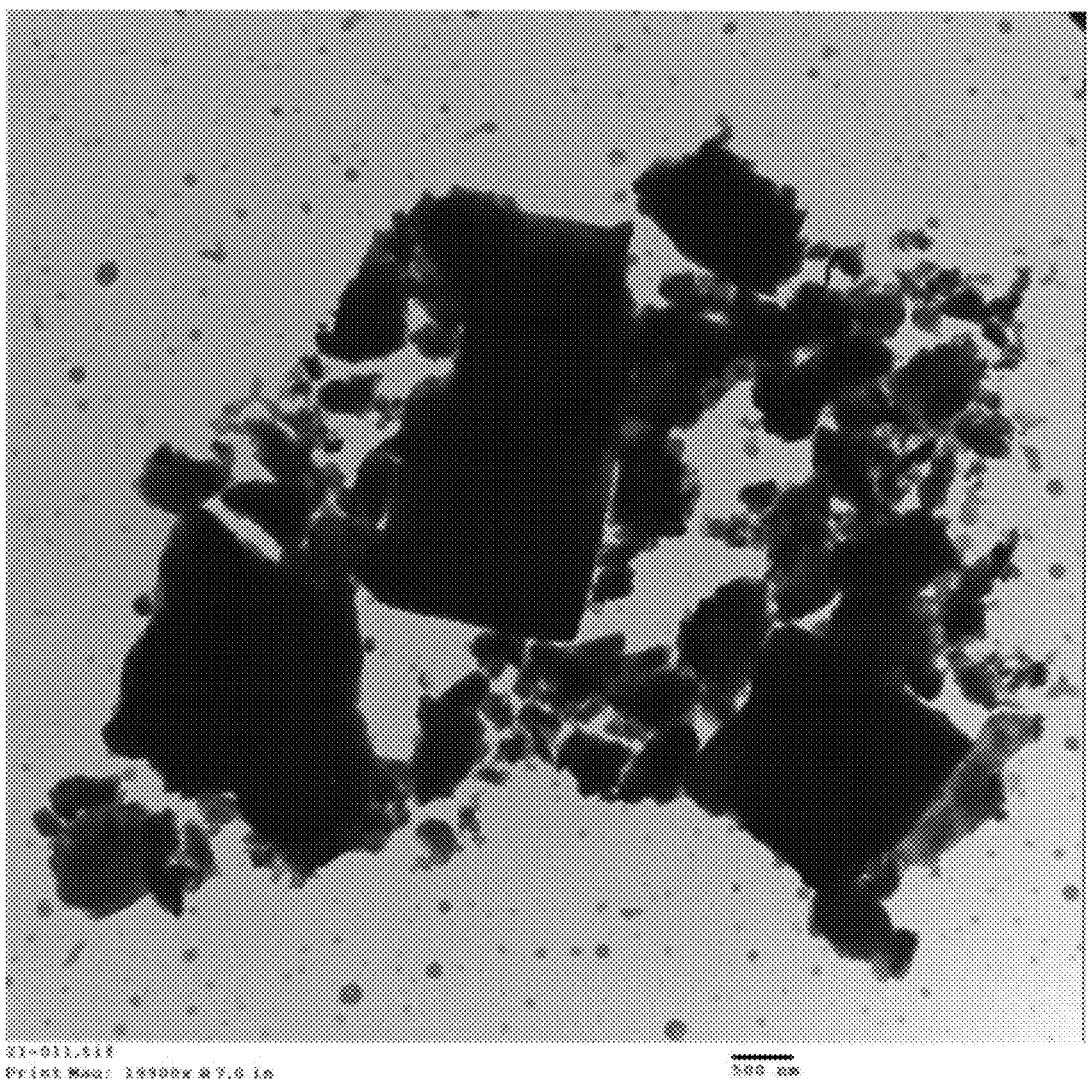
FIG. 6A shows 10× coated $CaCO_3$ based $CaB_6$.
Figure 6B:
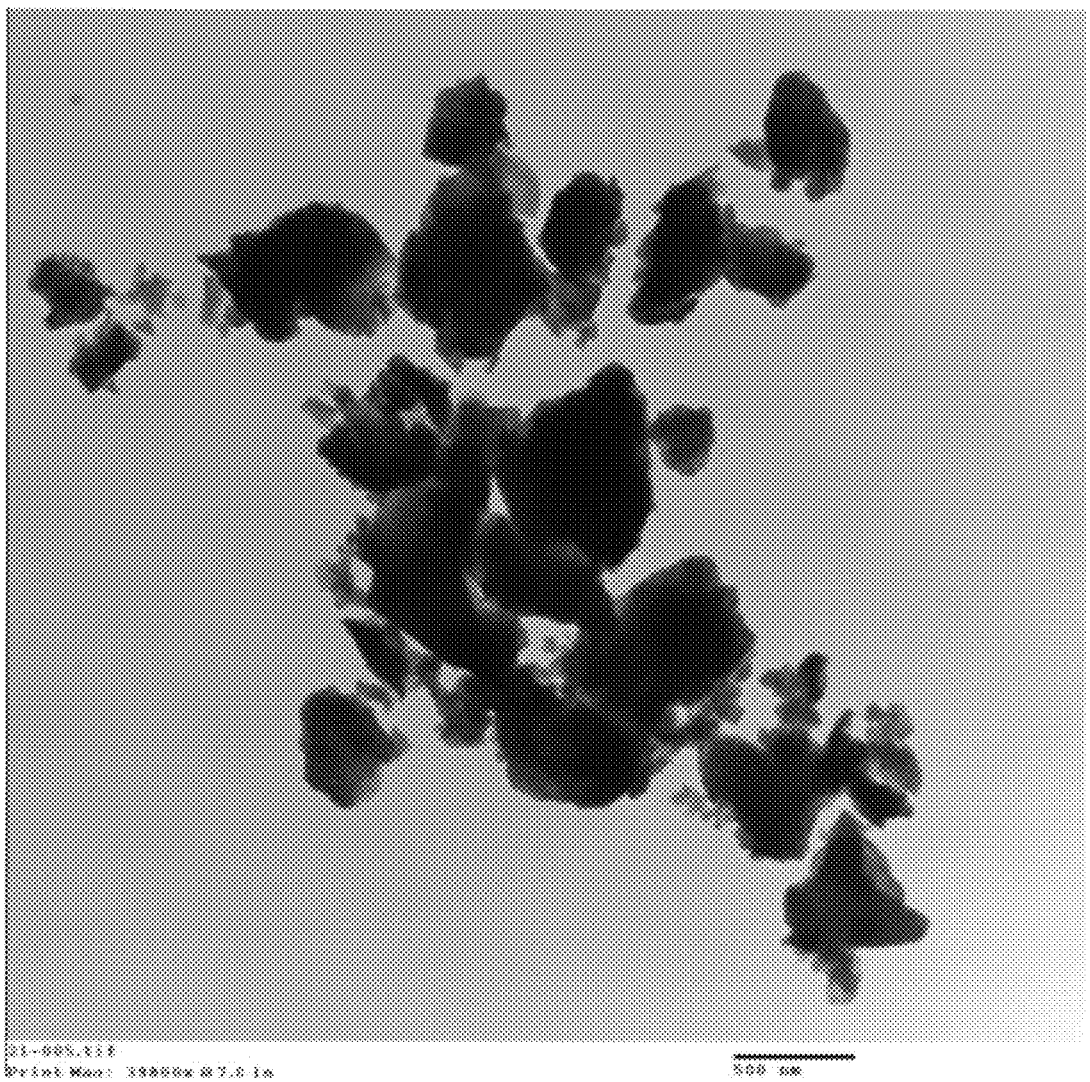
FIG. 6B shows 10× coated $CaCO_3$ based $CaB_6$.

As we compare the results of the synthesis reaction using the cycle coated calcium carbonate precursor, we find that the 110 peak is not as intense as in the case of the non-coated $CaCO_3$ precursor, but the overall XRD spectrum is much cleaner, as there are no visible non-indexed peaks. All the peaks match very well with the spectra found in various reported studies. The 1600° C. reaction for 3 hours also shows a weight loss of 82.34%, which indicates near-completion of the reaction, as it is very close to the required 82.60%. Numerous TEM images were collected which show that most particles were below 500 nm in size, as it can be seen in FIG. 6b. FIG. 6a shows some larger particles, however the morphology of these larger particles are showing a more defined structure, as they are more plate like. The specific surface area of this specimen was found to be 2 $m^2 g^{-1}$.

Figure 7:
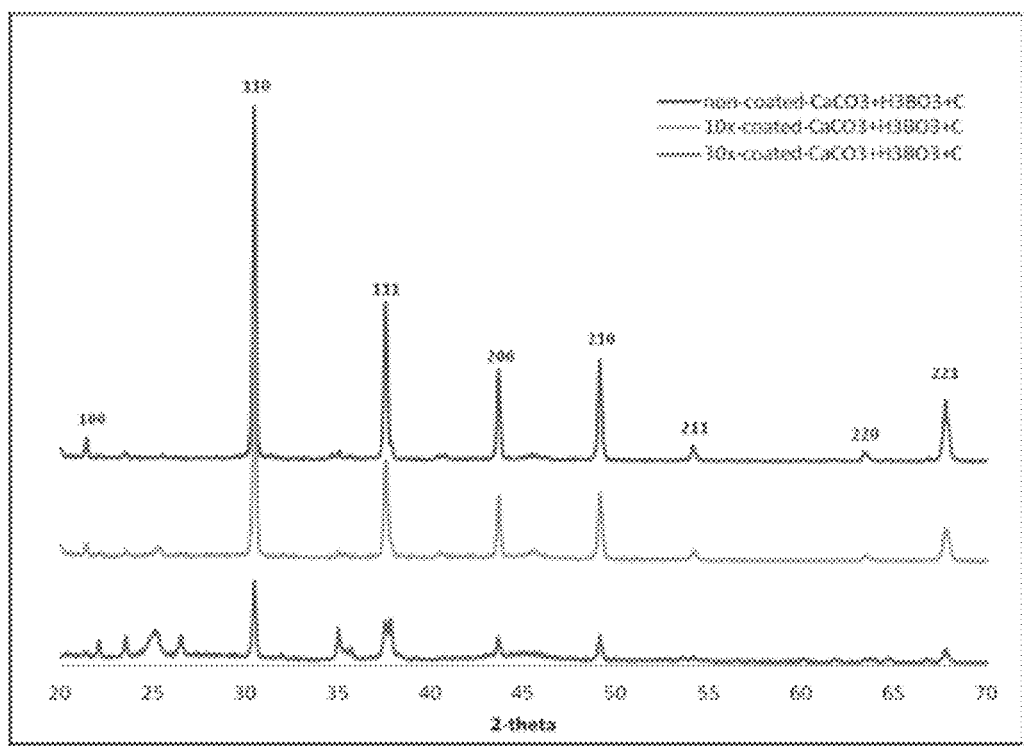
FIG. 7 is a line drawing showing an XRD spectrum of the effect of carbon coating on $CaCO_3$ for preparation of $CaB_6$ at 1500 degrees C.

Following these experiments, it was desired to react the above mentioned precursors at 1500° C. under flowing argon. So far, the experiments conducted include the non-coated-coated-$CaCO_3$+$H_3BO_3$+C and 30-cycle-coated-$CaCO_3$+$H_3BO_3$+C. These precursors were successfully reacted at 1500° C. for 4 hours under flowing argon, and the XRD spectrums for these samples are shown in FIG. 7.

The significance of the above mentioned experiments is the successful synthesis of calcium hexaboride, at 1500° C., as it can be seen that the non-coated-$CaCO_3$+$H_3BO_3$+C precursor yielded a fairly clean XRD spectrum when treated at 1500° C. for 4 hours under flowing argon in the box furnace. The product prepared from 10 cycle-$CaCO_3$+$H_3BO_3$+C also showed fairly decent formation, but it seems a little weaker than the non-coated sample. The same can definitely not be said about the 30-cycle-coated-$CaCO_3$+$H_3BO_3$+C. The specific surface area of these samples are 1 $m^2 g^{-1}$, 4 $m^2 g^{-1}$, and 3.6 $m^2 g^{-1}$. From the surface areas as well, it is quite evident that the non-coated sample shows a stronger completion of the reaction, but the higher surface area in case of the coated sample may indicate better particle size.

Example 6

This example describes the seeding of 10-cycle-coated-$CaCO_3$+$H_3BO_3$+C. Unless otherwise described, all methods are as in Examples 1-5.

Figure 8:
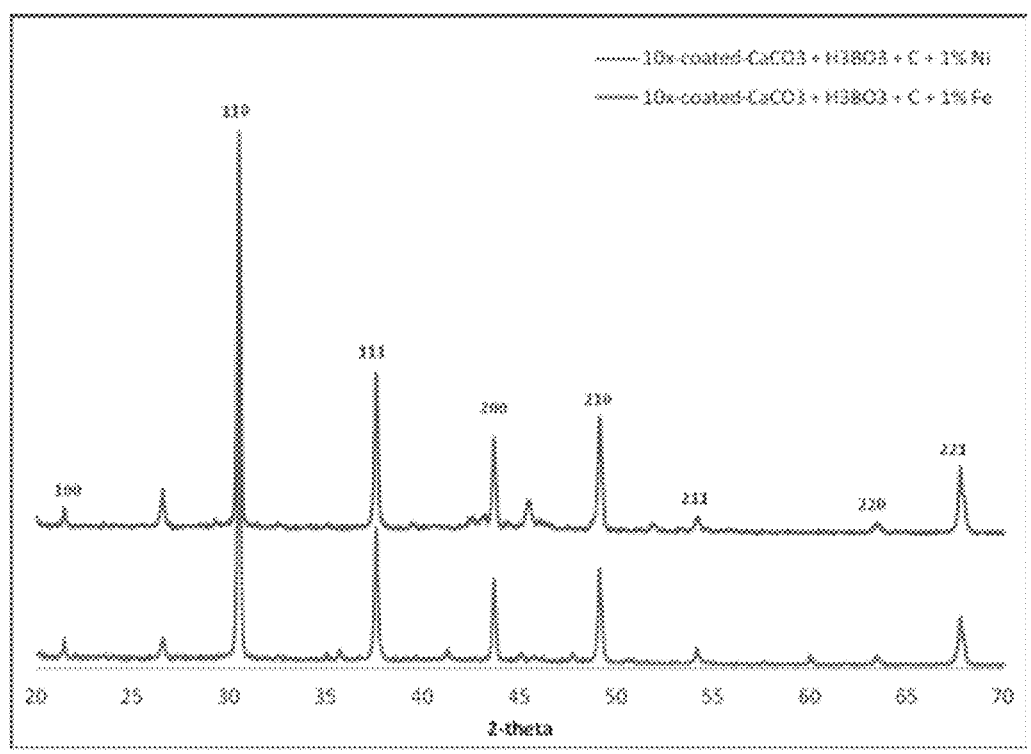
FIG. 8 is a line drawing showing an XRD spectrum of the effect of seeding agents on 10× carbon coated precursor for the synthesis of $CaB_6$ at 1600 degrees C. for 3 hours.
Figure 9A:
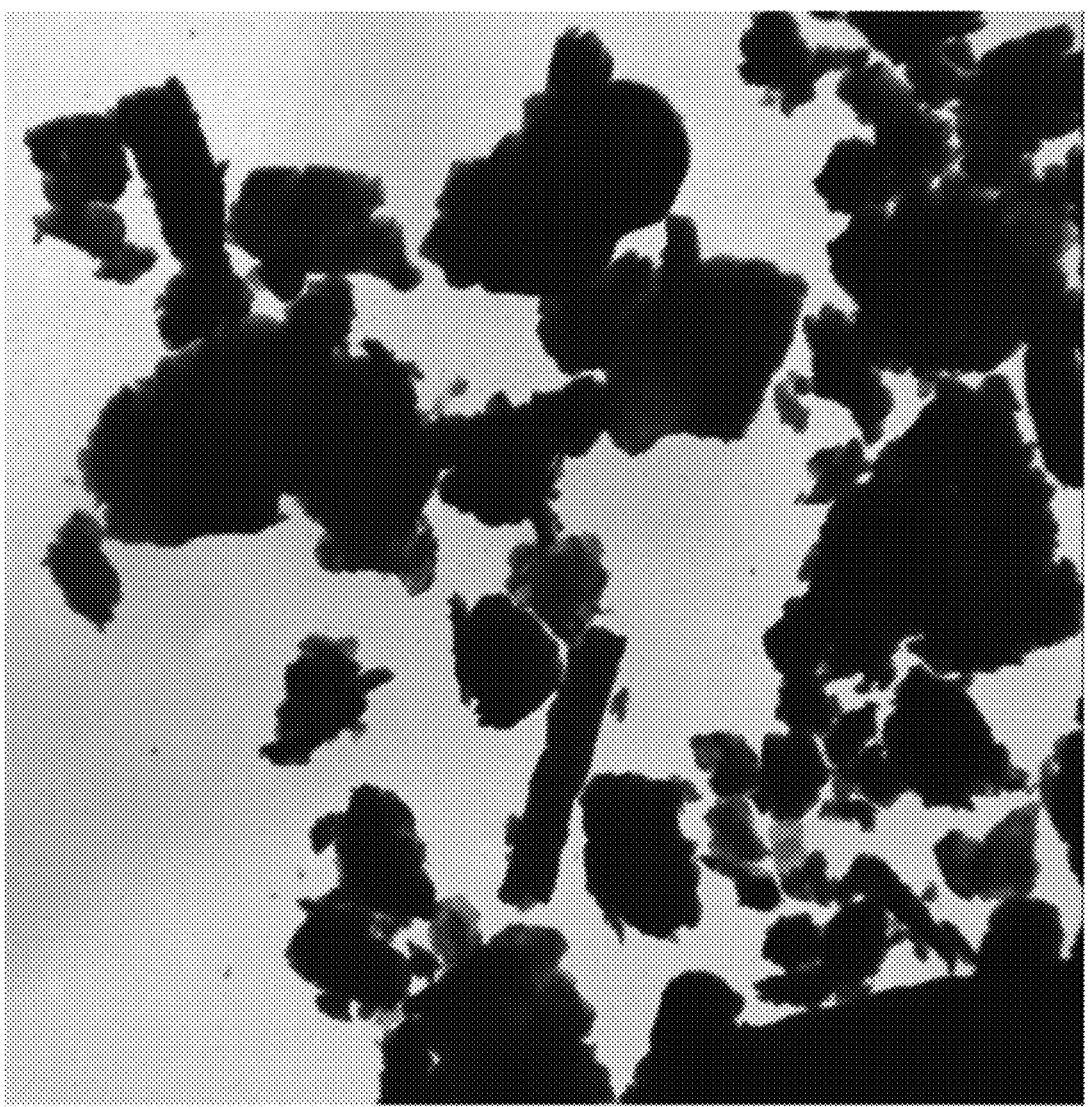
FIG. 9A-D show TEM images of 10-cycle coated $CaCO_3+H_3BO_3+1\%$ Ni.
Figure 9B:
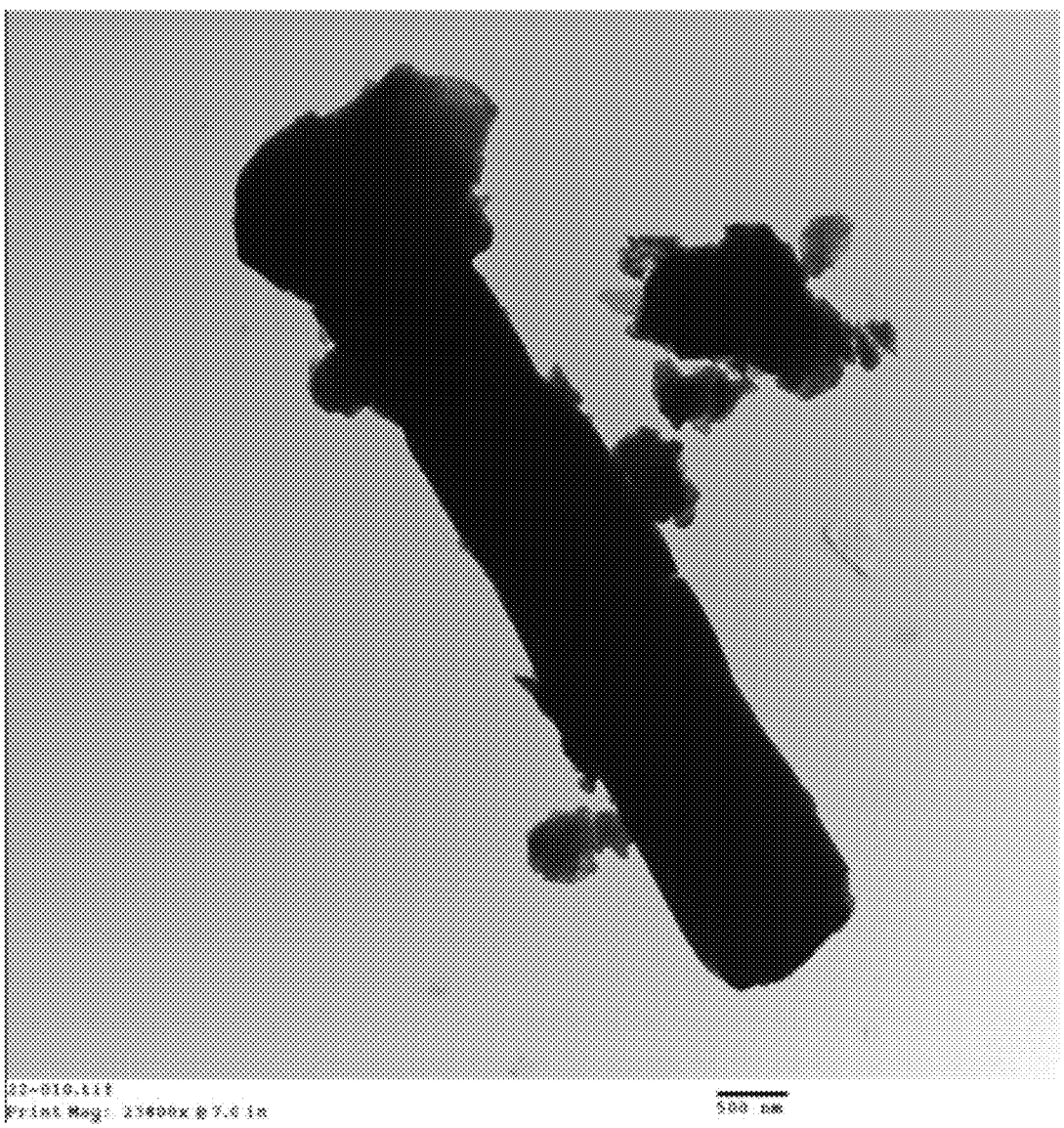
Figure 9C:
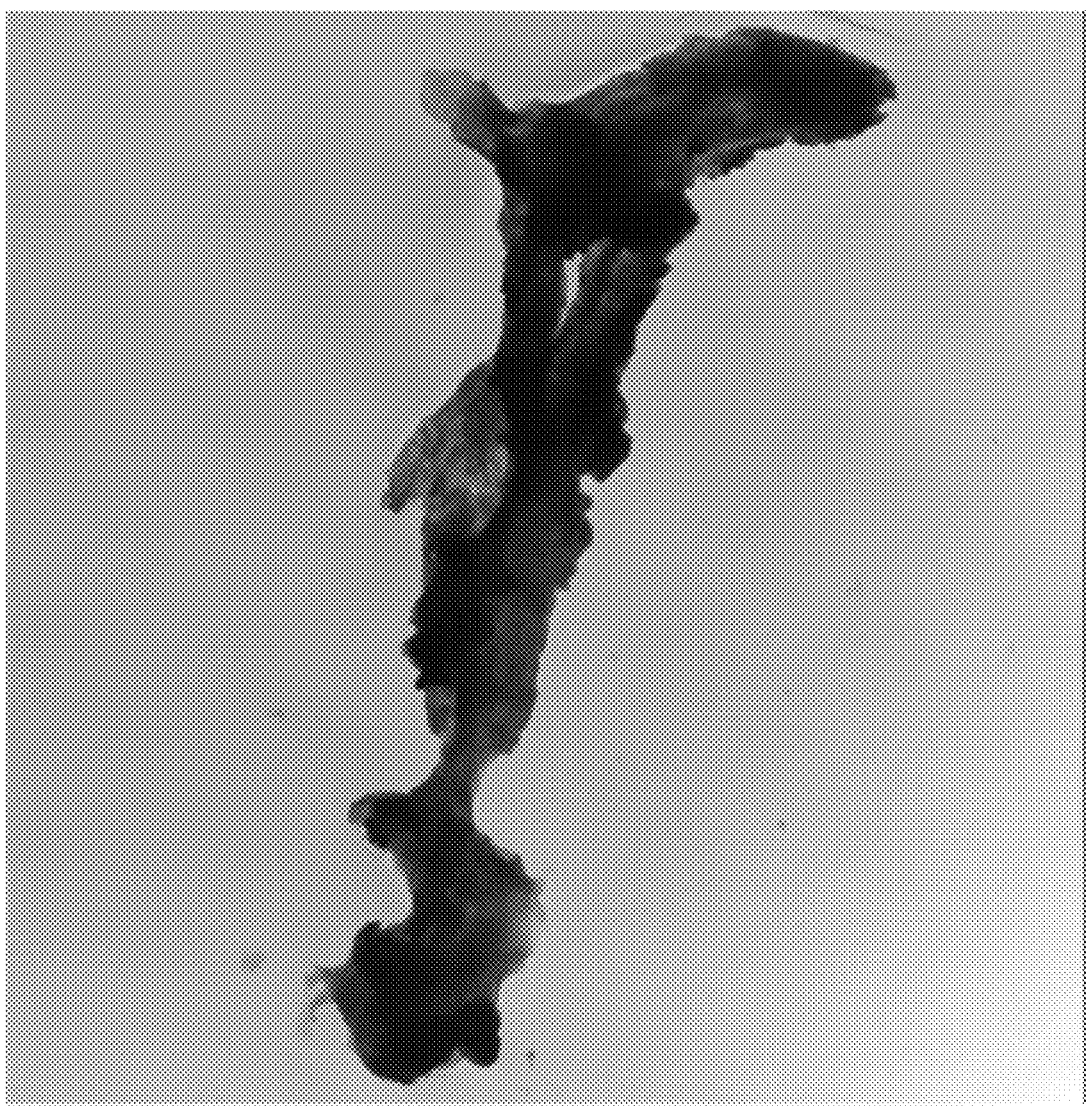
Figure 9D:
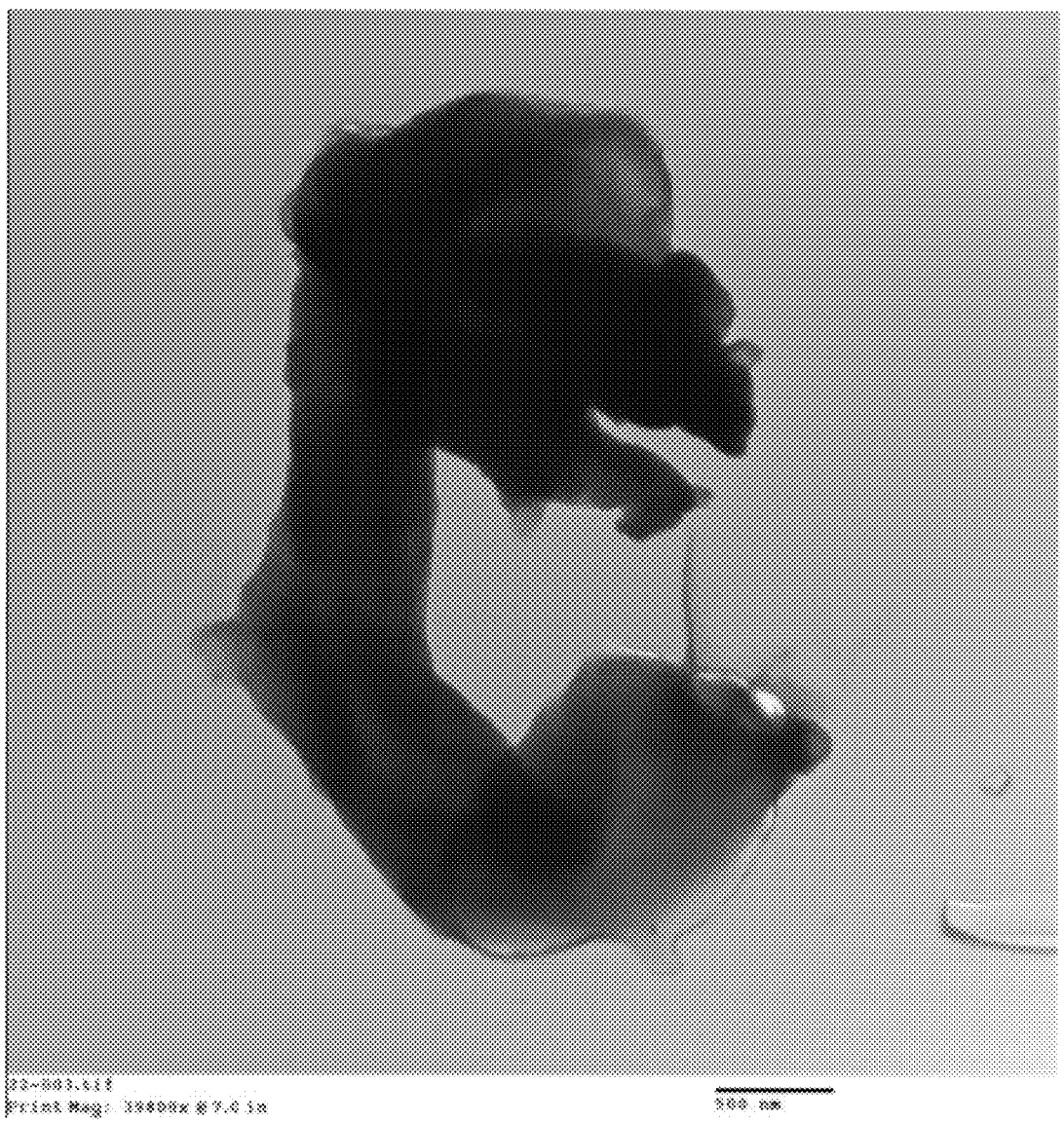
Figure 10A:
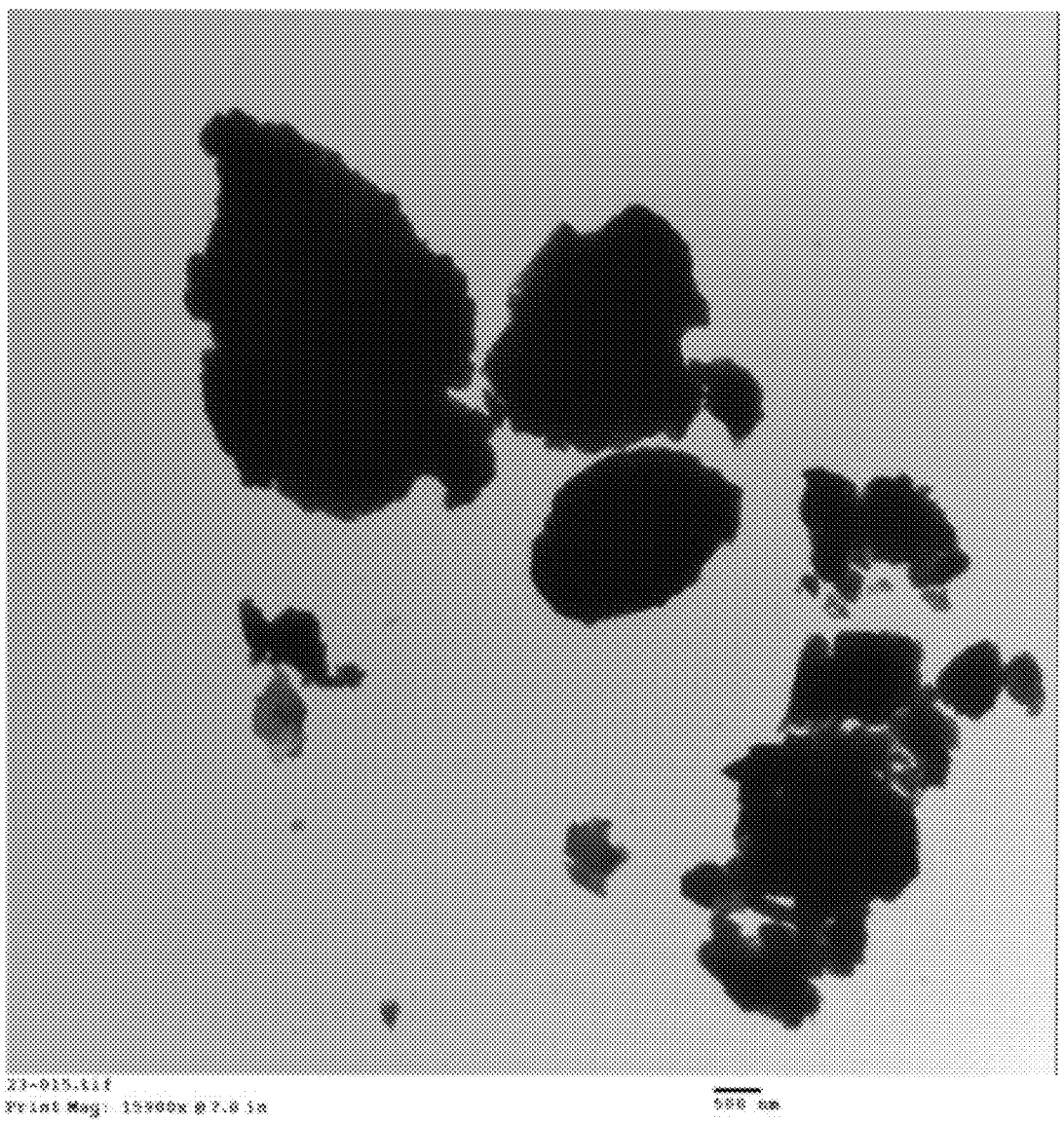
FIG. 10A-B shows TEM images of 10-cycle-coated $CaCO_3+H_3BO_3+1\%$ Fe.
Figure 10B:
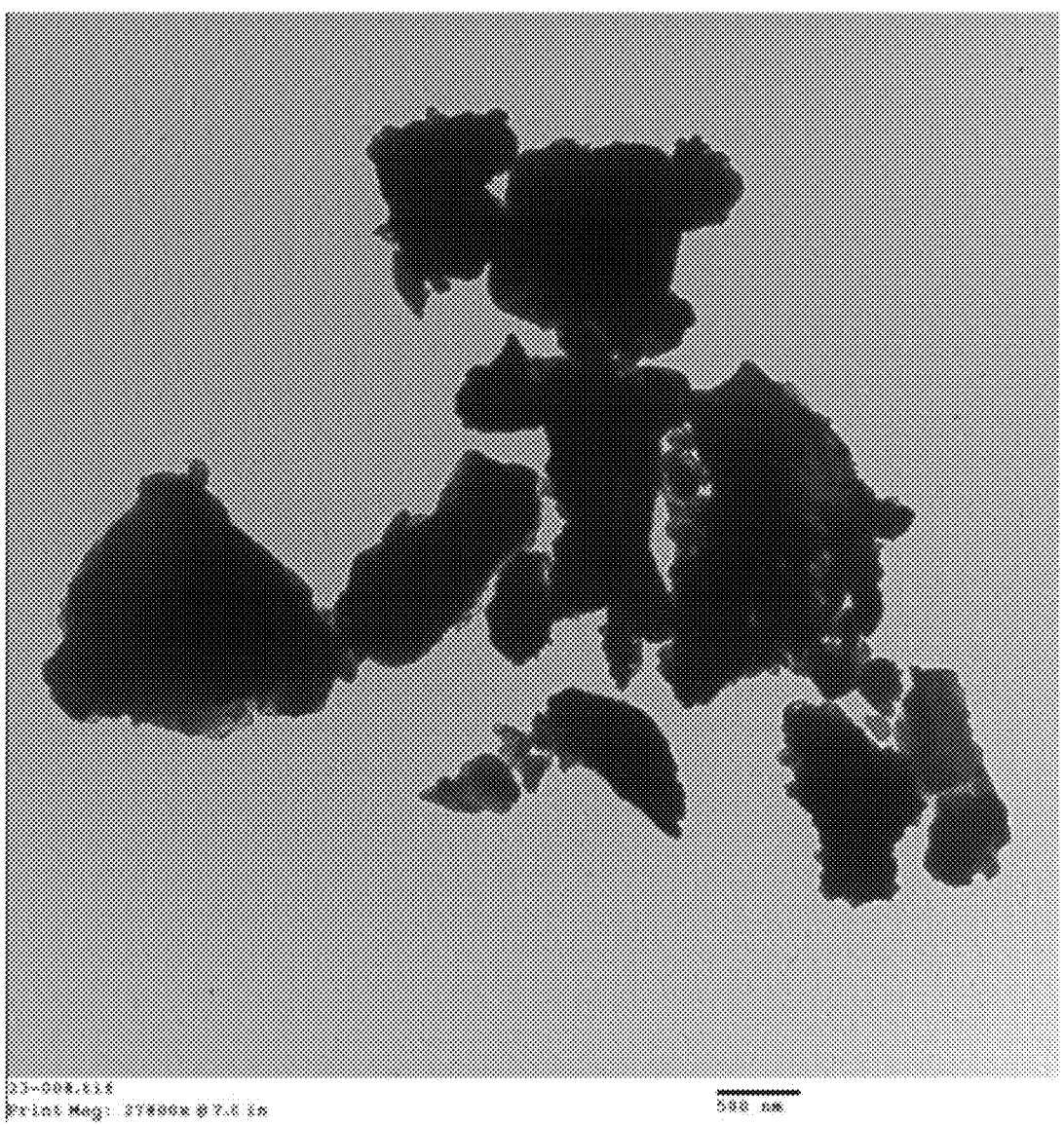
Figure 11:
FIG. 11 shows a TEM image of $CaB_6$ synthesized from carbon-coated carbon boride+carbon-coated calcium carbonate.

Following these experiments, an effort was made to improve the morphology of the particles. This was done by seeding the 10-cycle-coated-$CaCO_3$+$H_3BO_3$+C precursors by adding an additional 1% Ni in one case and 1% Fe in another case. The Ni and Fe were added to the mentioned precursor in an argon-flushed glove-box, after which they were mixed for 20 minutes in the Spex 8000 mixer. These samples were reacted at 1600° C. for 3 hours. XRD spectrums of the synthesis reactions using the seeded precursors are provided in FIG. 8 and TEM imaging is illustrated in FIGS. 9 and 10.

The XRD spectrum of the product of the reactions using the two seeded precursors shows that the final product is primarily $CaB_6$, along with a few extra peaks. The closest matches that were found for the other peaks were carbides of nickel and iron, however, the intensities of these peaks were too low to confirm this. The formation of these carbides is likely because of the addition of 1% of these powders; but the seeding amount is so small as to mostly prevent any significant formation of other compounds, and therefore, the goal of seeding them using these particles is kept in check. EDS spectra of these samples were collected, which indicated the presence of Nickel and Iron. Boron is a much lighter element, and is not detected by most EDS detectors. Therefore, the peaks primarily show two peaks of Ca, which indicate $k\alpha 1$ and $k\beta 1$. But, from XRD analysis, we know for a fact that the compound is primarily $CaB_6$.

The XRD spectra show that the sample prepared with 1% Ni shows a little more disturbance as compared to the sample with 1% Fe. TEM imaging of these samples provided in FIGS. 9 and 10 show this in more detail. It can be clearly seen from the differences in these two figures that nickel has a much stronger effect on the morphology of calcium hexaboride. Overall, the particles looked like the ones provided in FIG. 9a, which showed some small sub-micron, cloud-like structures, along with the presence of elongated structures, which looked more like rods or wires. The morphology in this case is more defined. FIG. 9b shows a magnified view of the rod-like structure. There are a couple of instances where the morphology is rather strange as shown in FIGS. 9c and 9d. This could be intermediate morphology, indicating that a longer reaction time may be required to fully process these structures. The weight loss of this sample was larger than the non-seeded sample, at 84.42%. The specific surface area also increased on comparison at 2.60 $m^2 g^{-1}$, indicating that the overall size of particles was smaller than the non-seeded sample.

The TEM imaging of the 1% Fe sample does not show much change in the morphology of the samples. However, the particles from this reaction appear to be more consistent, as it can be seen in FIGS. 9a and 9b. The particle sizes are mostly sub-micron from this sample, but there were a few that were largely agglomerated, which have not been included here. The weight loss after the reaction of this sample was found to be quite large though, with only a 9.51% final yield of $CaB_6$. The specific surface of this sample was larger than the 1% Ni and the non-seeded 10-cycle-coated-$CaCO_3$+$H_3BO_3$+C at 3.52 $m^2 g^{-1}$.

References

1. T. Xu, J. Zheng, A. Nicholls, S. Stankovich, R. Piner, R. Ruoff, Single-Crystal Calcium Hexaboride Nanowires: Synthesis and Characterization, Nano Letters (2004), Vol. 4, No. 1, pp. 2051-2055
2. J. Matsushita, K. Mori, Y. Nishi, Y. Sawada, Oxidation of Calcium Boride at High Temperature, Journal of Materials Synthesis and Processing (1998), Vol. 6, No. 6, pp. 407-410
3. S. Zheng, G. Min, Z. Zou, S. Tatsuyama, High Temperature Oxidation of calcium hexaboride powders, Materials Letters 58 (2004), pp. 2586-2589
4. S. Zheng, G. Min, Z. Zou, H. Yu, J. Han, Synthesis of Calcium Hexaboride Powder via the Reaction of Calcium Carbonate with Boron Carbide and Carbon, Journal of American Ceramic Society 84 (2004), No. 11, pp. 2725-2727
5. Z. Lin, M. Guanghui, Y. Huashun, Reaction mechanism and size control of $CaB_6$ micron powder synthesized by the boroncarbide method, Ceramics International 35 (2009) 3533-3536
6. L. Zhang, G. Min, H. Yu, H. Chen, G. Feng, The Size and Morphology of Fine $CaB_6$ Powder synthesized by Nanometer $CaCO_3$ as Reactant, Key Engineering Materials Vols. 326-328 (2006), pp. 369-372
7. L. Shi, Y. Gu, L. Chen, Z. Yang, J. Ma, Y Qian, Low Temperature Synthesis and Characterization of Cubic $CaB_6$ Ultrafine Powders, Chemistry letters 32 (2003), pp. 958-959
8. J Xu, Y Zhao, C Zou, Q Ding, Self-catalyst growth of single-crystalline $CaB_6$ nanostructures, Journal of Solid State Chemistry 180 (2007), pp. 2577-2580
9. A. Hermann, T. Chaudhari, P. Spagnol, Bipolar Plates for PEM Fuel Cells: A review, International Journal of Hydrogen Energy 30 (2005), pp. 1297-1302
10. D. Hodgson, B. May, P. Adcock, D. Davis, New lightweight bipolar plate system for polymer electrolyte membrane fuel calls, Journal of Power Sources 96 (2001), pp. 233-235
11. R. Koc, J. Folmer, Carbothermal synthesis of titanium carbide using ultrafine titania powders, Journal of Materials Science 32 (1997), pp. 3101-3111

What is claimed is:

1. A method for producing a metal boride, the method comprising:
   (a) carbon-coating a first compound comprising a metal and carbon-coating a second compound comprising a boron, wherein the carbon-coating comprises
      (i) decomposing a first hydrocarbon gas in the presence of the first compound so as to form a first carbon-coated compound; and
      (ii) decomposing a second hydrocarbon gas in the presence of the second compound so as to form a second carbon-coated compound; and
   (b) reacting the first carbon-coated compound and the second carbon-coated compound at a predetermined temperature for a predetermined time sufficient to form a metal boride;
   wherein (a) occurs before (b).

2. The method of claim 1, wherein carbon-coating the first compound and carbon-coating the second compound comprises:
   (i) providing the first compound;
   (ii) providing the second compound; and
   (iii) decomposing the first hydrocarbon gas and the second hydrocarbon gas in the presence of the first compound and the second compound so as to form the first carbon-coated compound and the second carbon-coated compound.

3. A method according to claim 1, wherein the first compound is selected from the group consisting of Ca, CaO, $CaCO_3$, $Al(OH)_3$, $Al_3(BO_3)_4$, $Al_2O_3$, Aluminum borohydrite, an Aluminum salt, $ZrO_2$, and $Al_2O_3$.

4. A method according to claim 1, wherein the second compound is selected from the group consisting of B, $B_4C$, $B_2O_3$, and $H_3BO_3$.

5. The method of claim 1, wherein:
   the first compound comprises calcium; and
   the metal boride comprises calcium hexaboride.

6. The method of claim 1, wherein the first hydrocarbon gas or the second hydrocarbon gas is independently selected from the group consisting of methane, ethane, propane, butane, propylene, 1,3 butadiene, acetylene, allene, butene, neopentane, ethylene, methylacetylene, and natural gas.

7. The method of claim 1, wherein carbon-coating the first compound or carbon-coating the second compound occurs at a pressure of about 15 psi to about 50 psi.

8. The method of claim 1, wherein carbon-coating the first compound or carbon-coating the second compound occurs at a temperature of about 100 degrees C. to about 1000 degrees C.

9. The method of claim 1, wherein carbon-coating the first compound or carbon-coating the second compound occurs in an inert atmosphere.

10. A method claim 1, wherein
    repeating carbon-coating of the first compound from about 10 to about 30 times; or
    repeating carbon-coating of the second compound from about 10 to about 30 times.

11. A method of claim 10, wherein one cycle of carbon-coating the first compound or carbon-coating the second compound, wherein the predetermined time is about 10 minutes to about 30 minutes.

12. A method according to claim 1, wherein reacting the first carbon-coated compound and the second carbon-coated compound occurs at a temperature of at least about 1000 degrees C.

13. A method according to claim 1, wherein reacting the first carbon-coated compound and the second carbon-coated compound occurs at a temperature increase or decrease rate of about 1 degrees C. per minute to about 10 degrees C. per minute.

14. A method according to claim 1, wherein reacting the first carbon-coated compound and the second carbon-coated compound occurs in an inert atmosphere.

15. A method according to claim 1, wherein reacting the first carbon-coated compound and the second carbon-coated compound occurs for about 1 hour to about 6 hours.

16. A method according to claim 1, wherein reacting the first carbon-coated compound and the second carbon-coated compound comprises:
    reacting the first carbon-coated compound, the second carbon-coated compound, and about 1% Fe or about 1% Ni.

17. A method according to claim 1, wherein
    decomposing the first hydrocarbon gas in the presence of the first compound comprises decomposing the first hydrocarbon gas in the presence of the first compound and about 1% Fe or about 1% Ni; or
    decomposing the second hydrocarbon gas in the presence of the second compound comprises decomposing the second hydrocarbon gas in the presence of the second compound and about 1% Fe or about 1% Ni.

18. A method according to claim 1, wherein the metal boride comprises an average particle size diameter of about 100 nm to about 1000 nm.

19. A method according to claim 1, wherein the metal boride comprises an average specific surface area of about 0.1 $m^2 g^{-1}$ to about 10 $m^2 g^{-1}$.

20. The method of claim 1, wherein:
the first compound comprises oxygen; or
the second compound comprises oxygen.

21. The method of claim 1, wherein
the first compound comprises a carbonate; or
the second compound comprises a borate.

22. The method of claim 1, wherein carbon-coating the first compound and the second compound and reacting the first carbon-coated compound and the second carbon-coated compound are at different temperatures.

23. The method of claim 22, wherein the temperature of carbon-coating the first compound and the second compound is lower than the temperature of reacting the first carbon-coated compound and the second carbon-coated compound.

24. The method of claim 1, wherein carbon-coating the first compound or second compound occurs at a temperature of at least about 100 degrees C.

25. The method of claim 1, wherein reacting the first carbon-coated compound and the second carbon-coated compound occurs at a temperature of at least about 1000 degrees C.

26. The method of claim 1, wherein the metal of the first compound and the boron of the second compound do not substantially react during carbon-coating.

27. The method of claim 1, wherein the first hydrocarbon gas and the second hydrocarbon gas are the same.

28. The method of claim 1, wherein the first hydrocarbon gas and the second hydrocarbon gas are different.

29. The method of claim 1, wherein the first compound and the second compound are carbon-coated separately.

30. The method of claim 1, wherein the first hydrocarbon gas or the second hydrocarbon gas comprise a plurality of hydrocarbon gases.

31. The method of claim 1, wherein the first compound and the second compound are carbon-coated together.

\* \* \* \* \*